United States Patent
Ogawa

(10) Patent No.: US 7,406,863 B2
(45) Date of Patent: Aug. 5, 2008

(54) CONTACT-STATE OBTAINING APPARATUS AND TIRE-DEFORMATION DETECTING APPARATUS

(75) Inventor: Atsushi Ogawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 84 days.

(21) Appl. No.: 11/045,395

(22) Filed: Jan. 31, 2005

(65) Prior Publication Data
US 2005/0188754 A1    Sep. 1, 2005

(30) Foreign Application Priority Data
Feb. 26, 2004    (JP) .............. 2004-050875

(51) Int. Cl.
*G01M 17/02* (2006.01)
(52) U.S. Cl. ...................................... 73/146
(58) Field of Classification Search ........ 73/146–146.8; 340/442–447
See application file for complete search history.

(56) References Cited

U.S. PATENT DOCUMENTS

| | | | | |
|---|---|---|---|---|
| 5,864,056 | A * | 1/1999 | Bell et al. ................ | 73/146 |
| 6,138,505 | A * | 10/2000 | Miyazaki ................ | 73/146 |
| 6,293,140 | B1 * | 9/2001 | Lohberg ................. | 73/146 |
| 6,340,930 | B1 * | 1/2002 | Lin ........................ | 340/447 |
| 6,952,954 | B2 * | 10/2005 | Liebemann et al. ...... | 73/146 |
| 6,959,593 | B2 * | 11/2005 | Mancosu et al. ......... | 73/146 |
| 2002/0078740 | A1 * | 6/2002 | Imao et al. ............. | 73/146 |
| 2002/0092364 | A1 * | 7/2002 | Adderton et al. ........ | 73/862.41 |
| 2004/0246117 | A1 * | 12/2004 | Ogawa et al. ........... | 340/445 |

FOREIGN PATENT DOCUMENTS

| | | |
|---|---|---|
| JP | A 6-341822 | 12/1994 |
| JP | A 8-183433 | 7/1996 |
| JP | A 10-281944 | 10/1998 |

* cited by examiner

*Primary Examiner*—Edward Lefkowitz
*Assistant Examiner*—Jermaine Jenkins
(74) *Attorney, Agent, or Firm*—Oliff & Berridge, PLC

(57) ABSTRACT

A contact-state obtaining apparatus for obtaining a contact state in which a tire of a wheel of a vehicle contacts a road surface, the apparatus including a deformation detecting device which is supported by the wheel and which detects a deformation of the tire that is caused by a force exerted to the tire in a direction parallel to the road surface; and a contact-state obtaining portion which obtains, as the contact state, (a) a slipping state of the tire relative to the road surface and/or (b) the force exerted to the tire in the direction parallel to the road surface, based on the deformation of the tire detected by the deformation detecting device.

32 Claims, 16 Drawing Sheets

$$\begin{cases} \gamma_s = \dfrac{L_{as}}{L_{bs}} \\ \gamma_t = \dfrac{L_{at}}{L_{bt}} \end{cases} \quad \gamma_s > \gamma_t$$

$$\gamma_H = \dfrac{L_{aH}}{L_{bH}}$$

$$\gamma_L = \dfrac{L_{aL}}{L_{bL}} \quad \gamma_H > \gamma_L$$

$\gamma = \dfrac{La}{Lb}$  ← 54,58(FIG.2)

$M = \dfrac{L}{1+\gamma}\left(\dfrac{\gamma}{\cos\beta} + \sqrt{1+\gamma^2\tan^2\beta}\right)$ $$\tan \beta = \frac{M\delta}{L_x}$$

$$L_x = \omega \cdot R \cdot t$$

$$M\delta = M\delta\theta - \Delta M$$

CONTACT-STATE OBTAINING APPARATUS AND TIRE-DEFORMATION DETECTING APPARATUS

The present application is based on Japanese Patent Application No. 2004-050875 filed on Feb. 26, 2004, the contents of which are incorporated herein by reference.

BACKGROUND OF THE INVENTION

1. Field of the Invention

The present invention relates to a contact-state obtaining apparatus that obtains a contact state in which a tire contacts a road surface, and a tire-deformation detecting apparatus that detects a deformation of a tire.

2. Related Art Statement

Japanese Patent Application Publication 6-341822A discloses, as an example of a contact-state obtaining device, a side slip angle obtaining device including a first velocity detecting portion that is provided on the side of a body of a vehicle and detects a first velocity at which a contact point of a tire with a road surface moves on a straight axis line about which the tire is rotated; a second velocity detecting portion that detects a second velocity at which the contact point of the tire moves on a straight centerline of the tire; and a side slip angle calculating portion that calculates a side slip angle of the tire based on the first and second velocities.

The side slip angle obtaining device obtains, as the side slip angle, an angle relative to the centerline of the tire, of a displacement-direction vector representing a direction in which the tire displaces, i.e., a composite vector obtained by addition of a vector obtained by translating a velocity of a gravity center of the vehicle's body from the gravity center to the contact point of the tire and a tangential vector on the contact point about a vertical axis (i.e., a yaw axis) passing through the gravity center. The first velocity detecting portion detects, as a first component of the displacement-direction vector, the first velocity at which the contact point of the tire moves on the straight axis line about which the tire is rotated, the second velocity detecting portion detects, as a second component of the displacement-direction vector, the second velocity at which the contact point of the tire moves on the straight centerline of the tire, and the side slip angle calculating portion calculates the side slip angle of the tire based on the first and second velocities.

SUMMARY OF THE INVENTION

Thus, it is an object of the present invention to improve a contact-state obtaining apparatus that obtains a contact state in which a tire contacts a road surface.

Hereinafter, some examples of various modes of the present invention that are recognized as being claimable in the present application (hereinafter, referred to as the claimable modes, if appropriate) will be described and explained. Each of the following modes (1) through (27) is numbered like the appended claims, and depends from the other mode or modes, where appropriate, so as to help understand the claimable modes and to indicate and clarify possible combinations of elements or technical features thereof. It is, however, to be understood that the present invention is not limited to the elements or technical features of the following modes or the combinations thereof that will be described for illustrative purposes only. It is to be further understood that each of the following modes should be construed in view of not only the explanations associated therewith and but also the detailed description of the preferred embodiments of the invention, and that in additional claimable modes, one or more elements or one or more technical features may be added to, or deleted from, any one of the following specific modes.

(1) A contact-state obtaining apparatus for obtaining a contact state in which a tire of a wheel of a vehicle contacts a road surface, the apparatus comprising a deformation detecting device which is supported by the wheel and which detects a deformation of the tire that is caused by a force exerted to the tire in a direction parallel to the road surface; and a contact-state obtaining portion which obtains, as the contact state, at least one of (a) a slipping state of the tire relative to the road surface and (b) the force exerted to the tire in the direction parallel to the road surface, based on the deformation of the tire detected by the deformation detecting device.

In the contact-state obtaining apparatus in accordance with the first mode (1), at least one of the slipping state of the tire relative to the road surface and the force exerted to the tire in the direction parallel to the road surface is obtained based on the deformation of the tire.

The deformation detecting device detects the deformation of the tire that is caused by the force exerted to the tire in the direction parallel to the road surface. The deformation detecting device may be one which detects a deformation of the tire in a widthwise direction thereof that is caused by a force exerted to the tire in a lateral direction thereof parallel to the road surface, or one which detects a deformation of the tire in a circumferential direction thereof that is caused by a force exerted to the tire in a front-rear direction thereof parallel to the road surface. For example, the deformation detecting device may be one which includes a strain gauge, or one which includes a piezoelectric element. The deformation detecting device may be one which detects an amount of deformation of the tire in the widthwise or circumferential direction thereof, or one which detects a strain of the tire in the same direction as indicated above. If one of the deformation amount, and the strain, of the tire is detected, then the other can be obtained based on the detected one. Therefore, in the present specification, these two terms are used to indicate a same physical quantity.

The contact-state obtaining portion obtains at least one of the slipping state of the tire relative to the road surface and the force exerted to the tire in the direction parallel to the road surface. For example, in the case where the tire is actually slipping and the slipping of the tire is technically important, the "slipping state" may be a degree of the slipping; and, in the case where the tire is not actually slipping, or in the case where the tire is actually slipping but the slipping of the tire is not so important because the degree of the slipping is sufficiently low, the "slipping state" may be a judgment about whether the tire tends to slip or not, or may be a degree of tendency of slipping. The degree of slipping may be an amount of slip, a slip ratio, or a side slip angle (this is also called just "a slip angle"). In addition, since the degree of slipping tends to be higher when a friction coefficient μ of the road surface is small, than when the friction coefficient μ is great, the friction coefficient μ can be regarded as a sort of the degree of slipping. It goes without saying that the friction coefficient μ of the road surface can be used as the judgment about whether the tire tends to slip or not, or the degree of tendency of slipping.

The force exerted to the tire in the direction parallel to the road surface can be a force exerted to the tire in a lateral direction thereof (e.g., a side force or a cornering force), a force exerted to the tire in a front-rear direction thereof (e.g., a driving force or a braking force), or a force having two components corresponding to the force exerted in the lateral direction and the force exerted in the front-rear direction, respectively, but it cannot be a force exerted the tire in a vertical direction. Since the force exerted to the tire in the direction parallel to the road surface corresponds to a frictional force produced between the tire and the road surface, a friction coefficient with respect to the tire and the road surface can be regarded as a sort of the force exerted to the tire in the direction parallel to the road surface. The force exerted to the tire in the direction parallel to the road surface may be obtained when the tire is actually slipping, or when the tire is not actually slipping or the slipping of the tire is not so important.

Thus, the contact-state obtaining apparatus in accordance with the first mode (1) employs the deformation detecting device which detects the deformation of the tire, and at least one of the slipping state of the tire relative to the road surface and the force exerted to the tire in the direction parallel to the road surface is obtained based on the deformation of the tire detected by the deformation detecting device. Therefore, the present apparatus can accurately obtain the slipping state and/or the force exerted to the tire in the direction parallel to the road surface.

(2) The contact-state obtaining apparatus according to the mode (1), wherein the deformation detecting device comprises a widthwise-direction-strain detecting portion which detects a strain of the tire in a widthwise direction thereof that is caused by the force exerted to the tire in a lateral direction thereof parallel to the road surface.

If the strain of the tire in the widthwise direction thereof is detected, then the force exerted to the tire in the lateral direction thereof parallel to the road surface, or the slipping state of the tire in the lateral direction can be obtained. The widthwise direction of the tire is a direction parallel to an axis line about which the tire is rotated.

(3) The contact-state obtaining apparatus according to the mode (2), wherein the widthwise-direction-strain detecting portion comprises at least one sensor which detects a widthwise-direction strain of a radially extending portion of the tire that is caused by the deformation of the tire in the widthwise direction thereof.

If the strain of the radially extending portion of the tire is detected, then the strain of the tire in the widthwise direction thereof can be obtained with accuracy. For example, it is preferred that a strain gauge as an example of the widthwise-direction-strain detecting portion be provided while taking such a posture in which the gauge extends in a radial direction of the tire and can detect a widthwise-direction strain of the tire. According to this mode, one or more sensors may be provided in one tire. In the case where two or more sensors are provided in one tire, respective values detected by those sensors may be processed to obtain a widthwise-direction strain of the tire. In this case, errors caused by disturbances can be reduced.

(4) The contact-state obtaining apparatus according to the mode (3), further comprising an information processing portion which obtains, based on a value obtained by subtracting a value detected by the at least one sensor when the vehicle is running straight, from a value detected by the at least one sensor when the vehicle is turning, the widthwise-direction strain of the tire that is caused by the force exerted to the tire in the lateral direction thereof parallel to the road surface.

The value detected by the widthwise-direction-strain detecting portion additionally represents a strain of the tire that is caused by a load exerted to the wheel (i.e., a force exerted to the wheel in a vertical direction). Therefore, the strain of the tire caused by the lateral-direction force can be obtained based on the value obtained by subtracting the value detected when the vehicle is running straight, from the value detected when the vehicle is turning. It is preferred that respective values detected when the vehicle is running straight and when the vehicle is turning be values detected when the vehicle is running at a same speed. Alternatively, it is possible to detect a strain of the tire caused by the load when the vehicle is in a stopped state and subtract the thus detected strain from the strain detected when the vehicle is turning.

(5) The contact-state obtaining apparatus according to any of the modes (2) through (4), wherein the widthwise-direction-strain detecting portion comprises at least one sensor which detects a change of an actual length of a circumferentially continuous portion of the tire, the actual length being measured in a force-free state of the tire in which the tire is free of forces exerted thereto, the change being caused by the force exerted to the tire in the lateral direction thereof parallel to the road surface.

The force-free state of the tire is a state of the tire in which no forces (i.e., the force exerted to the tire in the direction parallel to the road surface, the force exerted to the tire in the vertical direction, or a force containing a component parallel to the road surface or a component in the vertical direction) are exerted to the tire. For example, the force-free state of the tire is a state of the tire in which the tire is not mounted on the wheel and accordingly does not support any weights of the vehicle. In this state, the actual length of the circumferentially continuous portion of the tire is equal to the product of a diameter of the continuous portion of the tire in which the sensor or sensors is or are provided, and a central angle corresponding to the continuous portion. When the sensor is deformed by the force exerted to the tire in the lateral direction parallel to the road surface, a length of the sensor itself (i.e., a length of a circumferentially continuous portion of the sensor in the force-free state of the tire) is changed. Based on this change, it is possible to obtain the widthwise-direction strain of the tire. According to this feature, the sensor may be one which detects a change of an actual length of a whole-circumferentially continuous portion (i.e., a circular portion) of the tire, or one or ones each of which detects a change of an actual length of a part-circumferentially continuous portion (i.e., an arcuate portion) of the tire. In the latter case, it is possible to provide one or more sensors in one tire. In the case where two or more sensors are provided in one tire, respective values detected by those sensors may be processed to obtain a widthwise-direction strain of the tire, in the same manner as described above.

(6) The contact-state obtaining apparatus according to any of the modes (1) through (5), wherein the deformation detecting device comprises a circumferential-direction-strain detecting portion which detects a strain of the tire in a circumferential direction thereof that is caused by the force exerted to the tire in a longitudinal direction of the vehicle parallel to the road surface.

If the strain of the tire in the circumferential direction thereof is detected, the force exerted to the tire in the longitudinal direction of the vehicle parallel to the road surface or the slipping state of the tire in the longitudinal direction can be obtained.

(7) The contact-state obtaining apparatus according to the mode (6), wherein the circumferential-direction-strain detecting portion detects a circumferential-direction strain of a radially extending portion of the tire that is caused by the deformation of the tire in the circumferential direction thereof.

(8) The contact-state obtaining apparatus according to any of the modes (1) through (7), wherein the contact-state obtaining portion comprises at least one of (a) a side slip angle obtaining portion which obtains a side slip angle of the wheel and (b) a friction coefficient obtaining portion which obtains a friction coefficient with respect to the tire and the road surface.

If the side slip angle or the frictional coefficient can be obtained, then the running of the vehicle can be effectively controlled based on the obtained information. Obtaining the frictional coefficient may include determining a specific value of the frictional coefficient, or judging whether the frictional coefficients is greater or smaller than a reference or standard frictional coefficient.

(9) The contact-state obtaining apparatus according to any of the modes (1) through (8), wherein the contact-state obtaining portion comprises a ratio-related-amount obtaining portion which obtains a ratio-related amount that is related to a ratio of one of an adhering range in which the tire adheres to the road surface and a slipping range in which the tire slips on the road surface, to an other of the adhering range and the slipping range; and a ratio-related-amount-dependent contact-state obtaining portion which obtains, based on at least the ratio-related amount obtained by the ratio-related-amount obtaining portion, the at least one of (a) the slipping state of the tire and (b) the force exerted to the tire.

When the vehicle is running straight, a direction (hereinafter, referred to as the "wheel-movement" direction) in which a point of contact of the wheel with the road surface (e.g., a point that is pre-determined on a centerline of a tread portion of the tire and is in contact with the road surface) moves coincides with a direction (hereinafter, referred to as the "rotation-plane" direction) in which a line of intersection of a rotation plane (i.e., a centerplane) of the wheel with the road surface extends. On the other hand, when the vehicle is turning, the rotation-plane direction is deviated from the wheel-movement direction because a surface of contact of the tire with the road surface tends to remain in the wheel-movement direction. A side slip angle is an angle contained by the wheel-movement direction and the rotation-plane direction. In a state in which the wheel is rotated with a side slip angle, a force is produced, in a lateral direction of the wheel, between the tire and the road surface. A side force as the force produced in the lateral direction is greater when the side slip angle is great, than it is when the side slip angle is small. A self-aligning torque as a moment caused by the side force operates in a direction to decrease the side slip angle.

As illustrated in FIG. 7, in the state in which the wheel is rotated with the side slip angle, a point on a centerline of an elastic ring (i.e., a breaker or a belt) of the tire is rotated along the following locus: Point A (contact-start point)→Point E →Point C (contact-end point), and the contact point of the tread portion of the tire with the road surface is moved, by a force exerted thereto from the road surface, along the following locus: Point A→Point B→Point C. The contact point is moved from Point A to Point B, while it is kept in contact with the road surface; and in the range between Point A and Point B, the tread portion is elastically deformed by, and between, the road surface and the elastic ring. This strain (i.e., a shearing strain) increases as the contact point moves from Point A to Point B, and a force corresponding to the strain is produced in the tread portion. Hereinafter, this force will be referred to as the "deformation-caused" force, since it is caused by the deformation of the tread portion. In a range where this deformation-caused force is smaller than a maximum frictional force of the road surface, the contact point of the tire is moved in the wheel-movement direction, while the deformation-caused force increases as the strain increases. Eventually, when the deformation-caused force exceeds the maximum frictional force of the road surface at Point B, the contact point of the tire with the road surface slips from Point B to Point C.

Thus, the range between Point A and Point B is called an adhering range; and the range between Point B and Point C is called a slipping range.

Assuming that the friction coefficient of the road surface is constant and accordingly the maximum frictional force of the road surface is constant, when the side slip angle is small, a ratio of the adhering range to the slipping range is great because the range where the deformation-caused force does not exceed the maximum frictional force, i.e., the adhering range is large. When the side slip angle is very small, the slipping range is very small. On the other hand, when the side slip angle is great, the ratio of the adhering range to the slipping range is small because Point B where the deformation-caused force exceeds the maximum frictional force approaches Point A. Thus, assuming that the friction coefficient of the road surface is constant, the ratio of the adhering range to the slipping range is smaller when the side slip angle is great than it is when the side slip angle is small. Meanwhile, assuming that the side slip angle is constant, when the maximum frictional force of the road surface is great, the adhering range where the deformation-caused force does not exceed the maximum frictional force is large and accordingly the above-indicated ratio is great; and when the friction coefficient of the road surface is small, Point B approaches Point A, the adhering range is small, and accordingly the ratio is small. From these facts, it can be understood that the side slip angle or the friction coefficient of the road surface can be obtained based on the ratio of the adhering range to the slipping range. As described later, this ratio may be obtained based on the value detected by the deformation detecting device, may be estimated based on, e.g., the friction coefficient of the road surface, or may be estimated based on, e.g., the friction coefficient of the road surface and a turning condition of the vehicle. The ratio-related amount may be the ratio itself, or a physical quantity corresponding, one to one, to the ratio. For example, the physical quantity corresponding, one to one, to the ratio may be a ratio of the adhering range to a contact length (i.e., the sum of the adhering range and the slipping range). Assuming that the contact length is constant, if the adhering range increases, then the slipping range decreases. Therefore, as the ratio of the adhering range to the slipping range increases, the ratio of the adhering range to the contact length also increases, in such a manner that the latter ratio corresponds, one to one, to the former ratio. In addition, the ratio of the slipping range to the contact length decreases as the ratio of the adhering range to the slipping range increases, such that the former ratio corresponds, one to one, to the latter ratio. Moreover, the physical quantity corresponding, one to one, to the ratio in issue may be a length of at least one of the adhering range and the slipping range. In the case where the contact length is obtained (for example, the contact length may be obtained as a value pre-determined based on a shape and/or a size of the tire, or obtained as a value determined based on a shape and/or a size of the tire and at least one of an air pressure and a load of the tire), the adhering range increases as the ratio in issue increases, such that the former ratio corresponds, one to one, to the latter ratio. Similarly, the slipping range increases as the adhering range decreases and the ratio in issue decreases, such that the former ratio corresponds, one to one, to the latter ratios.

(10) The contact-state obtaining apparatus according to claim 9, wherein the ratio-related-amount-dependent contact-state obtaining portion comprises a turning-condition detecting portion which detects a turning condition of the vehicle, and obtains, based on the ratio-related amount obtained by the ratio-related-amount obtaining portion, and the turning condition of the vehicle detected by the turning-condition detecting portion, the at least one of (a) the slipping state of the tire and (b) the force exerted to the tire.

Usually, a cornering force as a force exerted to the tire in the lateral direction depends upon, e.g., the turning condition of the vehicle. The side slip angle is greater when the cornering force is great, than it is when the cornering force is small. Before the tire reaches the critical state, the cornering force is greater when a steering angle of the wheel or an amount of operation of a steering member (hereinafter, both will be referred to as the steering-related amount) is great, than it is when the steering-related amount is small. Thus, it can be estimated that when the steering-related amount is great, the side slip angle is great.

In addition, assuming that the cornering force can be thought to have a magnitude corresponding to a centrifugal force exerted to the vehicle, it can be estimated that the side slip angle is greater when the centrifugal force that depends on a radius of turn of the vehicle (that is in substantial proportion to an inverse number of, e.g., the steering angle) and the running speed of the vehicle is great, than it is when the centrifugal force is small.

In any case, the turning condition of the vehicle can be effectively utilized in obtaining the frictional coefficient of the road surface, or the above-indicated ratio-related amount.

(11) The contact-state obtaining apparatus according to the mode (9) or (10), wherein the ratio-related-amount obtaining portion comprises a strain-change-dependent ratio-related-amount obtaining portion which obtains the ratio-related amount, based on a change of a strain of the tire in a widthwise direction thereof.

For example, based on a point where the widthwise-direction strain of the tire reaches a peak (i.e., a maximum magnitude), a point where the widthwise-direction deformation starts (i.e., a point where the widthwise-direction strain is detected for the first time), and a point where the widthwise-direction deformation ends (i.e., a point where the widthwise-direction strain becomes substantially equal to zero), it is possible to obtain the ratio-related amount that is related to the ratio of the adhering range to the slipping range.

(12) The contact-state obtaining apparatus according to the mode (11), wherein the ratio-related-amount-dependent contact-state obtaining portion comprises a friction-coefficient obtaining portion which obtains a friction coefficient of the road surface, based on at least the ratio-related amount obtained by the ratio-related-amount obtaining portion.

Assuming that the side slip angle is constant, it can be estimated that the friction coefficient of the road surface is greater when the ratio of the adhering range to the slipping range is great, than it is when the ratio is small.

(13) The contact-state obtaining apparatus according to the mode (12), wherein the ratio-related-amount-dependent contact-state obtaining portion further comprises a turning-condition detecting portion which detects a turning condition of the vehicle, and wherein the friction-coefficient obtaining portion obtains the friction coefficient of the road surface, based on the ratio-related amount obtained by the ratio-related-amount obtaining portion and the turning condition of the vehicle detected by the turning-condition detecting portion.

Based on the turning condition of the vehicle, and the ratio-related amount obtained based on the change of strain of the tire, the friction coefficient of the road surface can be obtained with accuracy.

(14) The contact-state obtaining apparatus according to any of the modes (9) through (13), wherein the ratio-related-amount obtaining portion comprises a friction-coefficient-dependent ratio-related-amount obtaining portion which obtains the ratio-related amount based on at least a friction coefficient with respect to the tire and the road surface.

Assuming that the turning condition of the vehicle is constant, the ratio of the adhering range to the slipping range is greater when the friction coefficient with respect to the tire and the road surface is great, than when it is when the friction coefficient is small. The friction coefficient may be obtained based on a condition of the road surface that is detected by a surface-condition sensor, or based on a braking force or a driving force at the time when a braking slip or a driving slip occurs. In the case where a navigation system is employed by the vehicle, the friction coefficient may be obtained based on information indicating a condition of the road surface.

(15) The contact-state obtaining apparatus according to the mode (14), wherein the contact-state obtaining portion further comprises a turning-condition detecting portion which detects a turning condition of the vehicle, and wherein the friction-coefficient-dependent ratio-related-amount obtaining portion obtains the ratio-related amount based on the friction coefficient with respect to the tire and the road surface and the turning condition of the vehicle detected by the turning-condition detecting portion.

(16) The contact-state obtaining apparatus according to any of the modes (9) through (15), wherein the deformation detecting device comprises a widthwise-direction-strain detecting portion which detects, as a strain of the tire in a widthwise direction thereof, an amount of change of an actual length of a circumferentially continuous portion of the tire in a force-free state thereof, the change being caused by the force exerted to the tire in a lateral direction thereof parallel to the road surface, and wherein the ratio-related-amount-dependent contact-state obtaining portion further comprises a side-slip-angle obtaining portion which obtains a side slip angle of the wheel based on at least the ratio-related amount obtained by the ratio-related-amount obtaining portion and the amount of change of the actual length detected by the widthwise-direction-strain detecting portion.

Assuming that the ratio-related amount is constant, the side slip angle can be determined as being greater when the amount of change of the actual length is great, than it is when the amount of change is small.

(17) The contact-state obtaining apparatus according to any of the modes (9) through (16), wherein the deformation detecting device comprises a widthwise-direction-strain detecting portion which detects a strain of the tire in a widthwise direction thereof that is caused by the force exerted to the tire in a lateral direction thereof parallel to the road surface, and wherein the ratio-related-amount-dependent contact-state obtaining portion further comprises a side-slip-angle obtaining portion which obtains a side slip angle of the wheel based on at least the ratio-related amount obtained by the ratio-related-amount obtaining portion and a maximum magnitude of the strain of the tire in the widthwise direction thereof detected by the widthwise-direction-strain detecting portion.

When the deformation of the tire has experienced the maximum frictional force of the road surface, i.e., when the deformation-caused force has exceeded the maximum frictional force, the maximum magnitude of the strain of the tire corresponds to the maximum frictional force. Therefore, the frictional force $\mu$ can be determined as being greater when the maximum magnitude of the strain is great, than it is when the maximum magnitude is small. In addition, based on the friction coefficient of the road surface and the load applied to the wheel, it is possible to obtain the maximum frictional force as the force exerted to the tire in the lateral direction parallel to the road surface.

In addition, assuming that the ratio of the adhering range to the slipping range is constant, the side slip angle can be determined as being greater when the maximum magnitude of the strain is great, than it is when the maximum magnitude is small. Assuming that the maximum magnitude of the strain is constant, the side slip angle can be determined as being smaller when the above-indicated ratio is great, than it is when the ratio is small.

Thus, based on the maximum magnitude of the strain and the ratio of the adhering range to the slipping range, it is possible to estimate the friction coefficient of the road surface, or the side slip angle of the wheel.

(18) The contact-state obtaining apparatus according to any of the modes (1) through (17), wherein the deformation detecting device comprises an actual-length-change detecting portion which detects an amount of change of an actual length of a circumferentially continuous portion of the tire in a force-free state thereof, and wherein the contact-state obtaining portion comprises a friction-coefficient-dependent side-slip-angle obtaining portion which obtains a side slip angle of the wheel based on at least the amount of change of the actual length detected by the actual-length-change detecting portion and a friction coefficient with respect to the tire and the road surface.

Assuming that the turning condition of the vehicle is constant, the ratio of the adhering range to the slipping range is greater when the friction coefficient of the road surface is great, than it is when the friction coefficient is small. In addition, assuming that the above-indicated ratio is constant, the side slip angle of the wheel can be estimated as being greater when the amount of change of the actual length of the circumferentially continuous portion of the tire is great, than it is when the amount of change is small.

(19) The contact-state obtaining apparatus according to any of the modes (1) through (17), wherein the deformation detecting device comprises an actual-length-change detecting portion which detects an amount of change of an actual length of a circumferentially continuous portion of the tire in a force-free state thereof, and wherein the contact-state obtaining portion comprises a side-slip-angle obtaining portion which obtains a side slip angle of the wheel based on at least the amount of change of the actual length detected by the actual-length-change detecting portion, a turning condition of the vehicle, and a friction coefficient with respect to the tire and the road surface.

In the contact-state obtaining apparatus in accordance with this mode, the side slip angle can be obtained based on the amount of change of the actual length of the circumferentially continuous portion of the tire, the turning condition of the vehicle, and the friction coefficient of the road surface. In addition, the friction coefficient of the road surface can be obtained based on the amount of change of the actual length of the circumferentially continuous portion of the tire and the turning condition of the vehicle. Assuming that the turning condition of the vehicle is constant, the above-indicated ratio or the friction coefficient of the road surface is greater when the amount of change of the actual length is great, than it is when the amount of change is small.

(20) The contact-state obtaining apparatus according to any of the modes (1) through (19), wherein the contact-state obtaining portion comprises a widthwise-direction-strain-dependent side-slip-angle obtaining portion which obtains a side slip angle of the wheel based on a length of a contact portion of the tire with the road surface in a direction parallel to a plane on which the wheel is rotated, and an amount of deformation of the tire that corresponds to a strain of the tire in a widthwise direction thereof.

The side slip angle of the wheel can be obtained based on the length of the contact portion of the tire in the direction parallel to the plane of rotation of the tire, and the widthwise-direction strain of the tire. It is preferred that the amount of widthwise-direction deformation of the tire be detected at a time around the time of detection of the maximum magnitude of the widthwise-direction strain of the tire, because a great amount of deformation of the tire can be obtained then and accordingly the accuracy of detection of the deformation amount can be improved. The length of the contact portion of the tire in the direction parallel to the plane of rotation of the tire can be obtained based on the rotation speed of the wheel, the radius of the tire, and an elapsing time. The measurement of the elapsing time is started at a time when the tire starts contacting the road surface, i.e., when the stain is detected for the first time.

(21) The contact-state obtaining apparatus according to any of the modes (1) through (20), wherein the deformation detecting device comprises a first detecting portion which detects a change of a strain of a radially extending portion of the tire in a widthwise direction thereof, and a second detecting portion which detects an amount of change of an actual length of a circumferentially continuous portion of the tire in a force-free state thereof, the change being caused by the force exerted to the tire in a lateral direction thereof parallel to the road surface, and wherein the contact-state obtaining portion comprises a complex contact-state obtaining portion which obtains, based on both a maximum magnitude of the strain of the tire in the widthwise direction thereof detected by the first detecting portion and the amount of change of the actual length detected by the second detecting device, the at least one of (a) the slipping state of the tire and (b) the force exerted to the tire.

The side slip angle of the wheel or the ratio-related amount can be obtained based on the amount of change of the actual length of the radially extending portion, the maximum magnitude of the widthwise-direction strain, and the contact length. In addition, the friction coefficient or the frictional force of the road surface can be obtained based on the ratio-related amount and the turning condition of the vehicle.

(22) The contact-state obtaining apparatus according to any of the modes (1) through (20), wherein the contact-state obtaining portion comprises a strain-change-dependent contact-state obtaining portion which obtains, based on a change of a strain of the tire in a widthwise direction thereof iteratively detected by the deformation detecting device, the at least one of (a) the slipping state of the tire and (b) the force exerted to the tire.

If the widthwise-direction strain of the tire can be iteratively obtained, i.e., if a locus of movement of a prescribed portion of the tire which portion is in contact with the road surface can be obtained, the side slip angle of the wheel, the friction coefficient of the road surface, or the force exerted to the tire in the lateral direction parallel to the road surface can be obtained. Therefore, if the time-wise change of the strain can be obtained, the adhering range and the slipping range can be obtained and accordingly the friction coefficient of the road surface can be obtained. In addition, if so, the side slip angle of the wheel can be obtained. The deformation detecting device may be one which includes a iteratively detecting portion which iteratively detects a widthwise-direction strain of a prescribed portion on a centerline of a tread portion of the tire, or one which includes a movement-locus detecting portion which detects a locus of movement of the prescribed portion relative to the road surface.

(23) The contact-state obtaining apparatus according to any of the modes (1) through (22), wherein the contact-state obtaining portion comprises a contact-length obtaining portion which obtains a contact length by which the tire contacts the road surface.

The length of contact of the tire with the road surface can be obtained based on a size and a shape of the tire, or based on a size and a shape of the tire and at least one of a load and an air pressure of the tire.

(24) The contact-state obtaining apparatus according to any of the modes (1) through (23), wherein the contact-state obtaining portion is supported by a member provided on a side of a body of the vehicle, and wherein the contact-state obtaining apparatus further comprises a radio communication device which communicates, by radio, information between the deformation detecting device and the contact-state obtaining portion.

Since the deformation detecting device is provided in the tire, wheel-state information including information representing the deformation of the tire is transmitted, by radio, from the deformation detecting device to the contact-state obtaining portion supported by the member provided on the side of the body of the vehicle. In the case where the deformation detecting device includes a plurality of sensors provided in one tire, respective values detected by those sensors may be processed either on the side of the wheel or on the side of the vehicle's body.

(25) A tire-deformation detecting apparatus for detecting a deformation of a tire, the apparatus comprising a detecting portion which is embedded in an outer wall of the tire and which outputs a signal representing a deformation of the detecting portion that is caused by a force exerted to the tire in a direction parallel to a road surface; and a processing portion which obtains, based on the signal outputted by the detecting portion, the deformation of the tire that is caused by the force exerted to the tire in the direction parallel to the road surface.

The outer wall of the tire surrounds an interior air layer thereof, and is mainly formed of rubber. It is preferred that the detecting portion be embedded in a tread portion (also called a crown portion) of the tire that is a portion of the outer wall thereof. However, the detecting portion may be provided in a side wall, or a shoulder portion, of the tire. In any case, since the detecting portion is provided in direct contact with the tire, it can directly detect the deformation of the tire caused by the force exerted thereto in the direction parallel to the road surface.

The detecting portion may include a strain gauge, or a piezoelectric element (e.g., a piezoelectric ceramic element or a piezoelectric plastic element), so long as it can produce an electric signal representing a change of a length thereof or a force exerted thereto. The detecting portion may be a commercially purchased product, which in turn is embedded in the outer wall of the tire as the rubber layer thereof, or it may be directly formed in the outer wall. In the former case, for example, the product may be embedded in such a manner that after a rubber layer is formed by extrusion and is cut into an appropriate length, and either before or after the rubber layer is molded into a green tire, the product is inserted to an appropriate depth of a tread portion as a portion of the rubber layer, and subsequently the rubber layer is molded while being vulcanized. Alternatively, the product may be embedded in such a manner that after two separate portions are formed, by extrusion, as the tread portion and are cut into respective appropriate lengths, the product is sandwiched by, and between, the two separate portions, and subsequently those are molded while being vulcanized. In the latter case, for example, the detecting portion may be formed in such a manner that two separate portions are obtained as the tread portion, the inner one of the two separate portions is vulcanized, subsequently the detecting portion plus, optionally, the processing portion is formed, by printing, on the vulcanized inner separate portion, then the outer separate portion is placed on the inner separate portion, and the two separate portions are molded while being vulcanized.

For example, in the case where the detecting portion includes a strain gauge, it is preferred that the strain gauge be provided in the vicinity of grooves of the tread portion of the tire. In the case where the detecting portion is one which detects a strain of the tire in a widthwise direction thereof, it is preferred that the detecting portion be provided in the vicinity of grooves of the tread portion of the tire that extend substantially parallel to the circumferential direction of the tire; and in the case where the detecting portion is one which detects a strain of the tire in a circumferential direction thereof, it is preferred that the detecting portion be provided in the vicinity of grooves of the tread portion of the tire that extend substantially parallel to the widthwise direction of the tire. In view of deformation and/or wearing of the tire, it is preferred that the detecting portion be provided at a position nearer to the center of rotation of the tire than to respective bottoms of the grooves.

The tire-deformation detecting apparatus in accordance with the twenty-fifth mode (25) may be employed by the contact-state obtaining apparatus in accordance with any of the first to twenty-fourth modes (1) through (24).

(26) The tire-deformation detecting apparatus according to the mode (25), wherein the processing portion is embedded in the outer wall of the tire.

(27) The tire-deformation detecting apparatus according to the mode (25) or (26), further comprising a transmitting portion which transmits, by radio, information representing the deformation of the tire obtained by the processing portion, and wherein the transmitting portion is embedded in the outer wall of the tire.

According to the mode (26) or (27), it is preferred that at least one of the processing portion and the transmitting portion be embedded in the outer wall of the tire.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described in detail a contact-state obtaining apparatus to which the present invention is applied, by reference to the drawings. The contact-state obtaining apparatus includes a deformation detecting apparatus to which the present invention is also applied.

Figure 1:
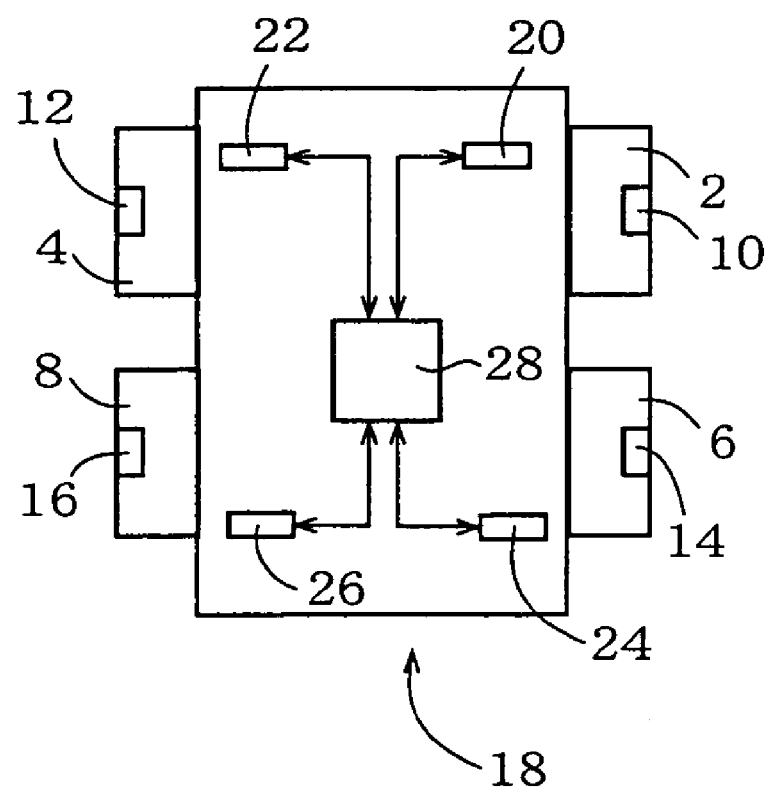
FIG. 1 is a schematic view of an automotive vehicle including a contact-state obtaining apparatus to which the present invention is applied, the contact-state obtaining apparatus including a tire-deformation detecting apparatus to which the present invention is also applied.

In FIG. 1, reference numerals 2, 4, 6, 8 designate a front right wheel, a front left wheel, ranger right wheel, and ranger left wheel of an automotive vehicle, respectively. The four wheels 2, 4, 6, 8 are provided with respective wheel-side devices 10, 12, 14, 16, respectively. Reference numeral 18 designates a body-side device that is supported by a member provided on the side of a body of the vehicle. The present contact-state obtaining apparatus includes the four wheel-side devices 10 through 16 and the body-side device 18. The body-side device 18 includes four signal receiving devices 20, 22, 24, 26 corresponding to the four wheel-side devices 10, 12, 14, 16, respectively; and an information processing portion 28 that processes wheel-state information represented by a signal received by each of the signal receiving devices 20, 22, 24, 26 and thereby obtains contact-state information representing a contact state in which a tire 40 (FIG. 3) of a corresponding one of the wheels 2, 4, 6, 8 contacts a road surface. Thus, the information processing portion 28 functions as a contact-state obtaining portion of the present contact-state obtaining apparatus.

Figure 2:
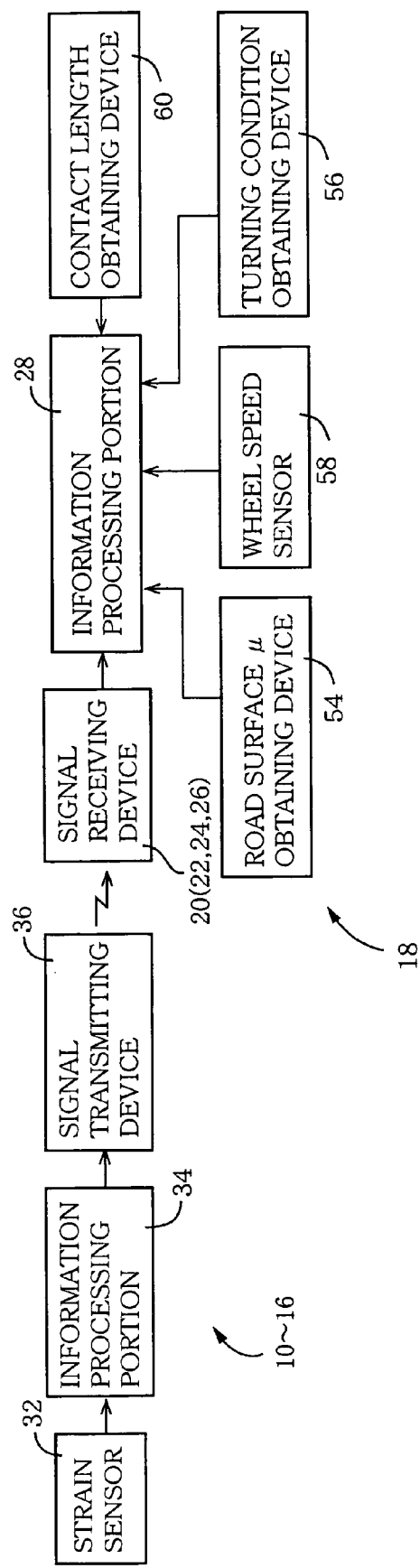
FIG. 2 is a diagrammatic view of the contact-state obtaining apparatus.

As shown in FIG. 2, each of the wheel-side devices 10, 12, 14, 16 includes a strain sensor 32 that detects, as a wheel state, a deformation of the tire 40 of a corresponding one of the wheels 2, 4, 6, 8; an information processing portion 34 that processes a value detected by the strain sensor 32; and a signal transmitting device 36 that transmits a signal representing wheel-state information obtained by the information processing portion 34. The information processing portion 34 is essentially constituted by a computer, and produces the wheel-state information including the value detected by the strain sensor 32, and an identification code identifying the each wheel-side device 10, 12, 14, 16, so that the signal transmitting device 36 transmits the wheel-state information to a corresponding one of the signal receiving devices 20, 22, 24, 26 of the body-side device 18.

Figure 3:
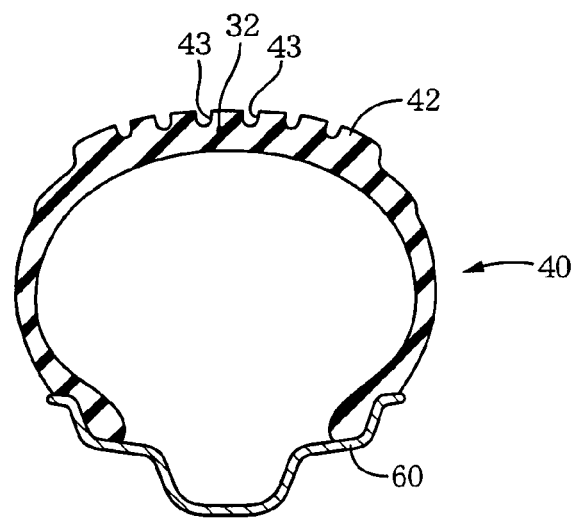
FIG. 3 is a cross-section view of a strain sensor as a portion of the tire-deformation detecting apparatus, and a tire in which the strain sensor is provided.
Figure 4:
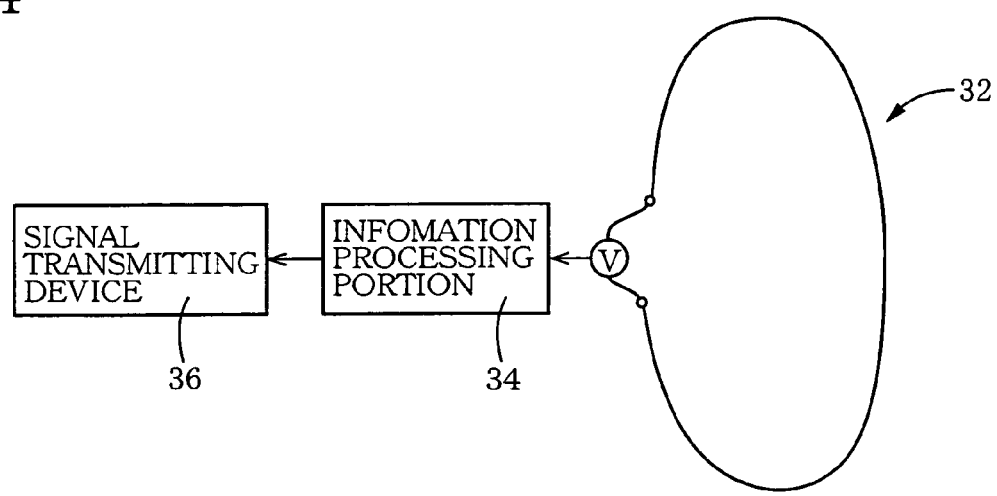
FIG. 4 is a schematic view of the strain sensor.

In the present embodiment, the strain sensor 32 of each of the wheel-side devices 10, 12, 14, 16 is embedded in a tread portion 42 of the tire 40 of a corresponding one of the wheels 2, 4, 6, 8, as shown in FIGS. 3 and 4, and detects a strain, or an amount of change of an actual length, of a circumferentially continuous portion of the tire 40 in a force-free state thereof. For example, after a green tire is formed by extrusion of a rubber layer, the strain sensor 32 is embedded in a portion of the rubber layer that corresponds to the tread portion 42, and subsequently the green tire is molded while being vulcanized.

Preferably, the strain sensor 32 is located in the vicinity of grooves 43 of the tread portion 42. Preferably, the grooves 43 extend parallel to a circumferential direction of the tire 40, but this is not essential. Since the tire 40 is worn little by little, it is preferred that the strain sensor 32 be located at a position away from respective bottoms of the grooves 43 in a radially inward direction toward an axis line of rotation of the tire 40. In addition, it is preferred that the strain sensor 32 be located along a circle whose center rides on the axis line of rotation of the tire 40.

In the present embodiment, the strain sensor 32 functions as a detecting portion of the deformation detecting apparatus; and the information processing portion 34 functions as a processing portion of the deformation detecting apparatus. The information processing portion 34 and the signal transmitting device 36 may be assembled into a unit, and may be accommodated in a common housing. The above-indicated rubber layer includes a crown portion, shoulder portions, side portions, and bead portions, and the crown portion as a portion of the rubber layer that contacts the road surface provides the tread portion 42 of the tire 40.

As shown in FIG. 2, the information processing portion 28 of the body-side device 18 is essentially constituted by a computer, and processes the wheel-state information received by each of the signal receiving devices 20, 22, 24, 26 and thereby obtains the contact state in which the tire 40 of a corresponding one of the wheels 2, 4, 6, 8 contacts the road surface. To the information processing portion 28, a road surface μ (friction coefficient) obtaining device 54 that obtains a friction coefficient μ of the road surface; a wheel speed sensor 56 that detects a rotation speed of each of the wheels 2, 4, 6, 8; a turning condition detecting device 58 that detects a turning condition of the vehicle; and a contact length obtaining device 60 that obtains a length of contact of the tire 40 with the road surface are connected.

The road surface μ obtaining device 54 may be one that obtains a friction coefficient μ of the road surface based on a condition of the road surface that is detected by a road-condition sensor; or one that obtains a friction coefficient μ of the road surface based on information supplied from a brake ECU (electric control unit) or a drive ECU, i.e., based on a braking force or a driving force when a braking slip or a driving slip occurs. Alternatively, the road surface μ obtaining device 54 may be one that obtains a friction coefficient μ of the road surface based on information supplied from a navigation ECU, i.e., based on information supplied from a communication facility that supplies information about the road surface.

The wheel speed sensor 56 may be one that detects an angular speed of rotation of each of the wheels 2, 4, 6, 8, or one that detects a peripheral speed of rotation of the same.

The turning condition detecting device 58 may be one that includes at least one of a steering amount sensor that detects an amount of steering (i.e., an amount of operation) of a steering member, a steering angle sensor that detects a steering angle θ of each of the wheels 2, 4, 6, 8, and a yaw rate sensor that detects a yaw rate of the vehicle; or one that includes, in addition to at least one of the steering amount sensor, the steering angle sensor, and the yaw rate sensor, a vehicle speed sensor that detects a running speed of the vehicle. That is, the turning condition detecting device 58 may be one that detects a degree of turning of the vehicle, or a centrifugal force exerted to the vehicle. Based on a value detected by the turning condition detecting device 58, the information processing portion 28 can judge whether the vehicle is running straight, or turning.

The contact length obtaining device 60 may be one that obtains a contact length that is determined in advance based on, e.g., a shape and a size of the tire 40, or one that determines a contact length based on the shape and size of the tire 40, a load vertically exerted to each of the wheels 2, 4, 6, 8, and/or an air pressure of the tire 40. In the latter case, the contact length obtaining device 60 may be one that includes at least one of a load sensor that detects the load and an air pressure sensor that detects the air pressure of the tire 40.

Figure 10:
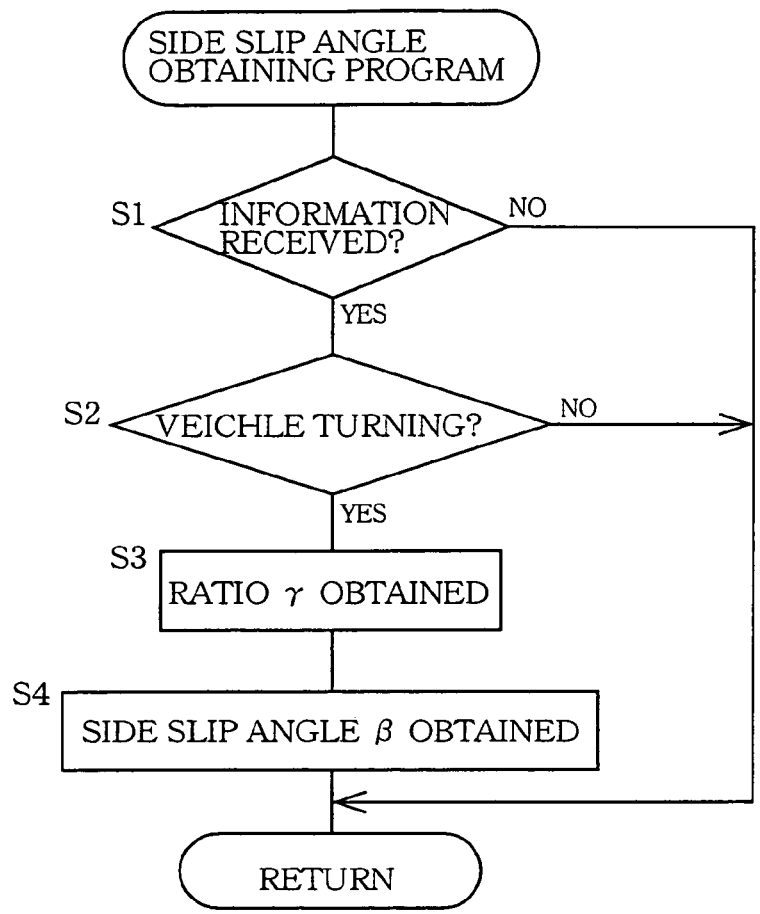
FIG. 10 is a flow chart representing a side slip angle obtaining program stored in a memory of the contact-state obtaining apparatus.
Figure 11:
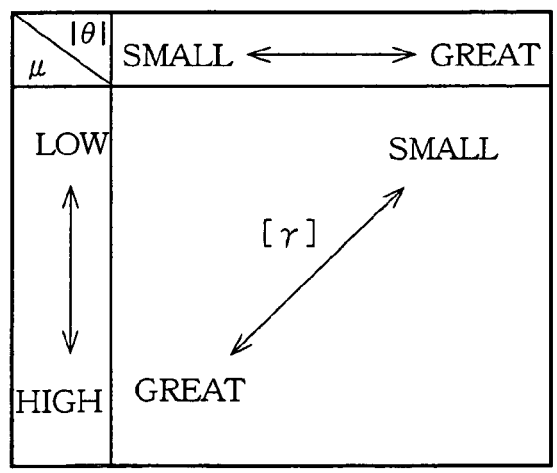
FIG. 11 is a map representing a ratio obtaining table stored in the memory of the contact-state obtaining apparatus.

The information processing portion 28 of the body-side device 18 includes a memory that stores a side slip angle obtaining program represented by a flow chart shown in FIG. 10, and a "ratio γ" obtaining table represented by a map shown in FIG. 11. Here, a relationship between a slipping state of the tire 40 and the ratio γ will be explained.

Figure 5:
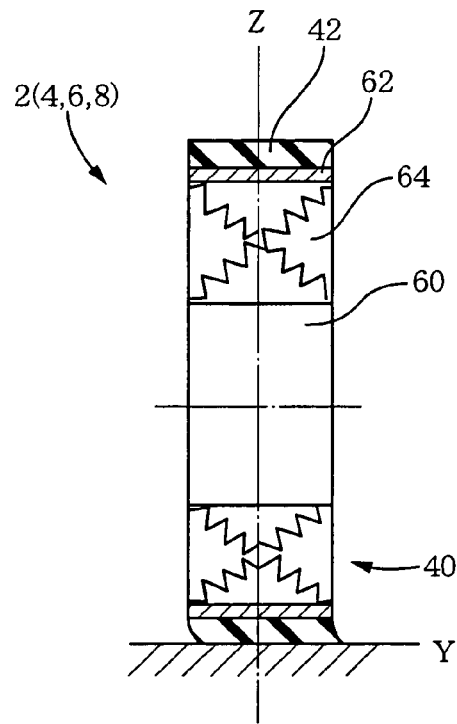
FIG. 5 is a view of a model of a wheel of the vehicle.

Each of the wheels 2, 4, 6, 8 can be modeled as shown in FIG. 5. According to this model, each wheel 2, 4, 6, 8 includes the tire 40, and a rim (i.e., a rigid member) 60 supporting the tire 40, and the tire 40 includes the tread portion 42, a breaker or a belt 62, and a carcass 64. The carcass 64 holds a high-pressure air; the tread portion 42 consists of a thick rubber layer and contacts the road surface; and the breaker or the belt 62 is provided between the tread portion 42 and the carcass 64, and has a rigidity lower than that of the tread portion 42 and higher than that of the carcass 64. A bias-ply tire 40 employs the breaker 62; and a radial-ply tire 40 employs the belt 62. Each of the breaker and the belt is a sort of elastic ring 62.

Figure 6:
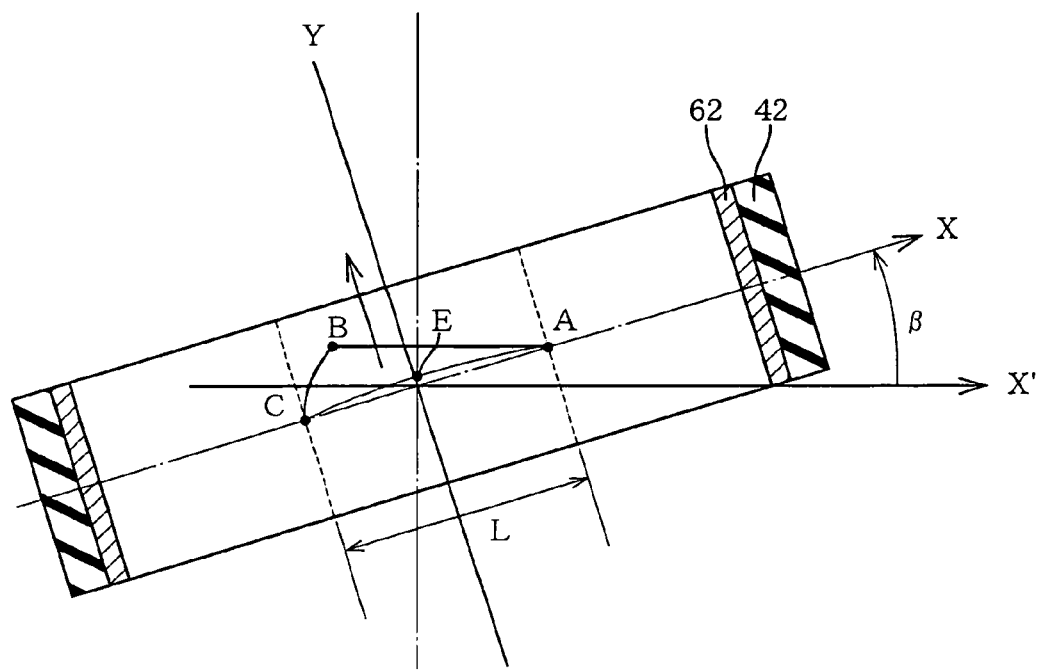
FIG. 6 is a view for explaining a contact state of a tire of the model with a road surface.

When the vehicle is running straight, a direction X' (FIG. 6) in which a point of contact of the tire 40 of each wheel 2, 4, 6, 8 with the road surface, e.g., a point that is pre-determined on a centerline of the tread portion 42 of the tire 40 and is actually in contact with the road surface moves, coincides with a direction X in which a line of intersection of a rotation plane (i.e., a center plane) of the each wheel 2, 4, 6, 8 with the road surface extends. Hereinafter, the direction X' will be referred to as the wheel-movement direction; and the direction X will be referred as the rotation-plane direction, if appropriate. On the other hand, when the vehicle is turning, the rotation-plane direction X is deviated from the wheel-movement direction X', as shown in FIG. 6, because a surface of contact of the tread portion 42 of the tire 40 with the road surface tends to remain. A side slip angle β is defined as an angle contained by the two directions X', X. In a state in which each wheel 2, 4, 6, 8 is rotated with a side slip angle β, a force F (FIG. 7) is produced, in a lateral direction of the tire 40, between the tread portion 42 of the tire 40 and the road surface. A lateral force Fy is exerted to a center point O of the contact surface of the tire 40. The lateral force Fy is greater when the side slip angle β is great, than it is when the side slip angle β is small. Since there is a distance e between a point where the force F is exerted to the tire 40 and the center point O, a self-aligning torque K as a moment acts on the tire 40 in a direction to decrease the side slip angle β.

Figure 7:
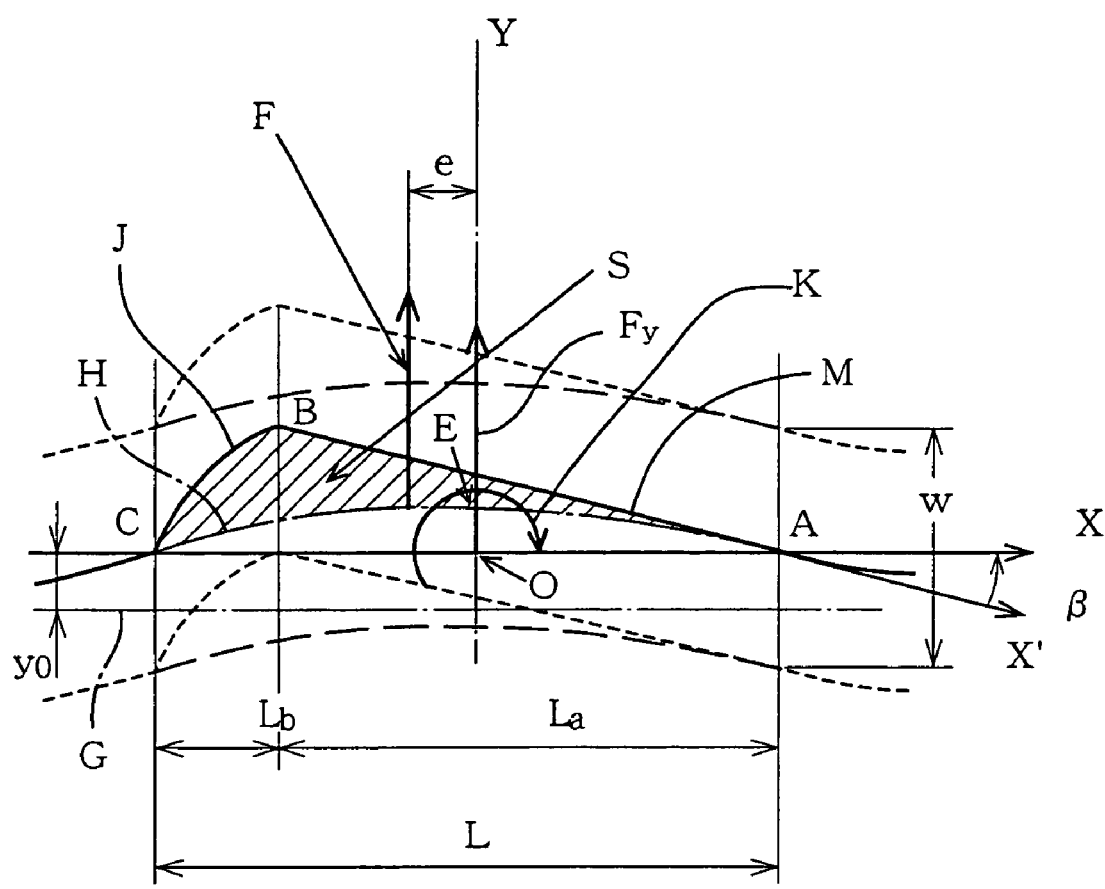
FIG. 7 is a view for explaining, in detail, the contact state of the tire with the road surface.

As shown in FIG. 7, in the state in which each wheel 2, 4, 6, 8 is rotated with the side slip angle β, a centerline G of the rim 60 is displaced by a distance y0 in the lateral direction, while a contact width w and a contact length L of the tire 40 with the road surface are not changed; a point on a centerline of the elastic ring 62 of the tire 40 is rotated along the following locus: Point A→Point E→Point C; and the contact point of the tire 40 is moved, by the force F exerted thereto from the road surface, along the following locus: Point A→Point B →Point C. The contact point is moved from Point A to Point B, while it is kept in adhesive contact with the road surface; and in the range between Point A and Point B, the tread portion 42 is elastically deformed by, and between, the road surface and the elastic ring 62. This strain (i.e., a shearing strain) increases as the contact point moves from Point A to Point B, and a force corresponding to the strain is produced in the tread portion 42. Hereinafter, this force will be referred to as the "deformation-caused" force, since it is caused by the deformation of the tread portion 42 in the widthwise direction of the tire 40. In the range where the deformation-caused force is smaller than a maximum frictional force of the road surface, the contact point of the tire 40 is moved in the direction X', while the deformation-caused force increases as the strain increases. Eventually, when the deformation-caused force exceeds the maximum frictional force of the road surface at Point B, the contact point of the tire 40 slips from Point B to Point C on the road surface. In FIG. 7, a centerline of the elastic ring 62 is indicated by H; a centerline of the contact surface of the tread portion 42 with the road surface is indicated by J; and the deformation of the tread portion 42 in the widthwise direction of the tire 40 is indicated by S.

Point A indicates a contact-start point where a predetermined point on the centerline of the tire 40 starts contacting the road surface; Point B indicates a point where the deformation-caused force exceeds the maximum frictional force of the road surface; and Point C indicates a contact-end point where the predetermined point on the tire 40 ends contacting the road surface. A distance between Point A and Point C indicates the contact length L. The range between Point A and Point B where the contact point of the tire 40 is moved from Point A to Point B is an adhering range La; and the range between Point B and Point C where the contact point slips from Point B to Point C is a slipping range Lb.

Figure 8A:
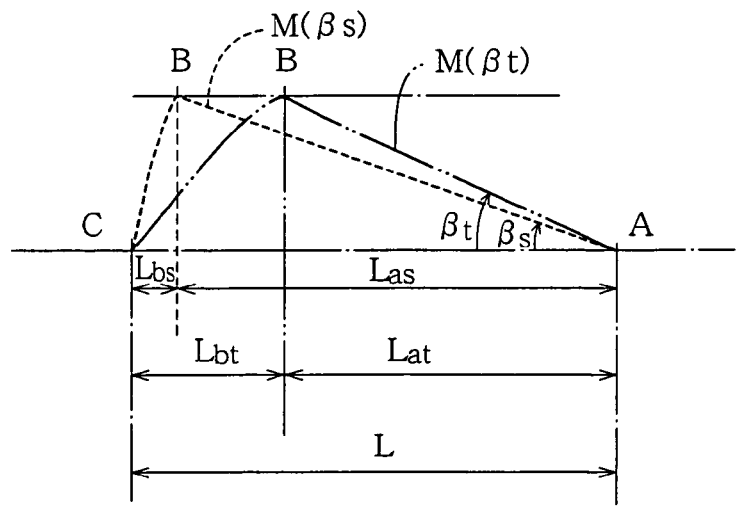
FIG. 8A is a schematic view for explaining an example of a deformation of the tire.

As illustrated in FIG. 8A, assuming that a friction coefficient μ of the road surface is constant and accordingly a maximum frictional force of the road surface is constant, when the side slip angle β is small (β=βs), a ratio γs (=Las/Lbs) of an adhering range Las to a slipping range Lbs is great, because the range where the deformation-caused force does not exceed the maximum frictional force, i.e., the adhering range Las is large. When the side slip angle β is very small, the slipping range Lbs is very small.

On the other hand, when the side slip angle β is great (β=βt), a ratio γt (=Lat/Lbt) of an adhering range Lat to a slipping range Lbt is small, because Point B where the deformation-caused force exceeds the maximum frictional force of the road surface approaches Point A. Thus, it can be understood that in the case where the friction coefficient μ of the road surface is constant, the ratio γ of adhering range La to slipping range Lb is smaller when the side slip angle β is great than it is when the side slip angle β is small, that is, γs>γt.

Figure 8B:
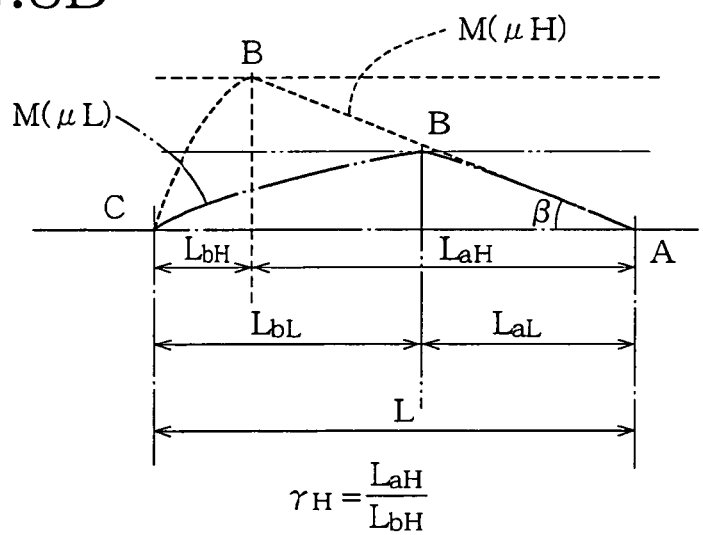
FIG. 8B is a schematic view for explaining another example of the deformation of the tire.

Meanwhile, as illustrated in FIG. 8B, assuming that the side slip angle β is constant, when a friction coefficient μH of the road surface is great and accordingly a maximum frictional force of the road surface is great, an adhering range LaH is large; and when a friction coefficient μL of the road surface is small and accordingly a maximum frictional force of the road surface is small, an adhering range LaL is small. Thus, it can be understood that in the case where the side slip angle β is constant, the ratio γ of adhering range La to slipping range Lb is greater when the friction coefficient μ of the road surface is great, than it is when the side slip angle β is small, that is, γH>γL.

Thus, in the present embodiment, the side slip angle β of each wheel 2, 4, 6, 8 is obtained based on an amount of change of an actual circumferential length of the tire 40 that is contained by the wheel-state information received by a corresponding one of the signal receiving devices 20, 22, 24, 26, and the ratio γ obtained based on the friction coefficient μ of the road surface and the turning condition of the vehicle.

The strain sensor 32 detects a value corresponding to an amount of change of an actual length of the sensor 32 per se that is caused by the frictional force of the road surface, that is, an amount of change of an actual circumferential length of a portion of the tire 40 in which the strain sensor 32 is embedded. This amount of change is equal to a difference δ of a length M, illustrated in FIGS. 7 and 8, and the contact length L (i.e., δ=M−L). Meanwhile, since the side slip angle β can be estimated based on the turning condition of the vehicle, e.g., an absolute value of the steering angle θ of each wheel 2, 4, 6, 8, the ratio γ of adhering range La to slipping range Lb can be estimated based on the friction coefficient μ of the road surface obtained by the road surface μ obtaining device 54 and the turning condition of the vehicle obtained by the turning condition obtaining device 58. FIG. 11 shows a map that is pre-stored as a table in the memory of the information processing portion 28 and that represents a relationship between (A) (a1) friction coefficient μ of road surface and (a2) absolute value |θ| of steering angle θ, and (B) ratio γ.

Figure 9:
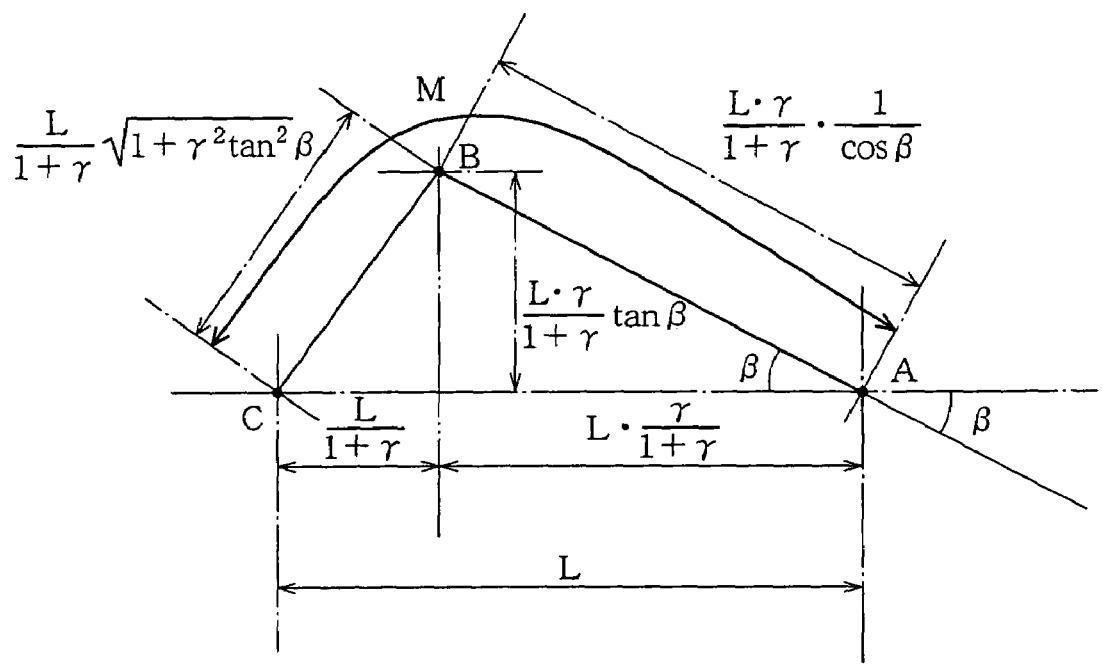
FIG. 9 is a schematic view for explaining a relationship between the deformation of the tire and a side slip angle of the wheel.

FIG. 9 shows a case where the locus of movement of the contact point of the tire 40 along Points A→B→C is approximated by a straight line. In this case, respective lengths of the adhering range La and the slipping range Lb can be expressed, using the contact length L and the ratio γ, by the following equations (1), (2):

$$La = L \cdot \gamma/(1+\gamma) \quad (1)$$

$$Lb = L/(1+\gamma) \quad (2)$$

In addition, using the side slip angle β, the change amount δ detected by the strain sensor 32 can be expressed by the following equation (3):

$$\delta = M - L \quad (3)$$
$$= \{L/(1+\gamma)\} \cdot \{\gamma/\cos\beta + \sqrt{(1+\gamma^2\tan^2\beta)}\} - L$$

Thus, the side slip angle β can be obtained based on the contact length L, the detected change amount δ, and the ratio γ.

The information processing portion 28 of the body-side device 18 carries out, at a pre-set regular interval of time (i.e., a very short cyclic time), a side slip angle obtaining program represented by a flow chart shown in FIG. 10.

At Step S1 of FIG. 10, the processing portion 28 judges whether the portion 28 has received the wheel-state information from any of the wheel-side devices 10, 12, 14, 16. If a positive judgment is made at Step S1, the control of the processing portion 28 proceeds with Step S2 to judge whether the vehicle is turning, based on the turning condition obtained by the turning condition detecting device 58. If a positive judgment is made at Step S2, the control goes to Step S3 to obtain a ratio γ based on the friction coefficient μ of the road surface obtained by the friction coefficient μ obtaining device 54, the absolute value of the steering angle θ obtained by the device 54, and the table shown in FIG. 11, and then goes to Step S4 to obtain a side slip angle β according to the above-indicated equation (3).

Thus, in the present embodiment, the amount δ of change of the actual length of the circumferentially continuous portion of the tire 40 in its force-free state can be directly detected, and the side slip angle β is obtained based on the directed detected change amount δ. Accordingly, the side slip angle β can be obtained with accuracy. In addition, the cornering force can be obtained based on the side slip angle β.

In the present embodiment, respective portions of the information processing portion 28 that stores, and carries out, the side slip angle obtaining program cooperate with each other to provide a side slip angle obtaining portion, or a friction-coefficient-dependent side slip angle obtaining portion. In addition, respective portions of the information processing portion 28 that stores, and utilizes, the ratio obtaining table represented by the map shown in FIG. 11, and stores, and carries out, Step S3 of FIG. 10 provide a ratio-related-amount obtaining portion. A ratio-related amount may be the ratio γ per se, or an amount corresponding, one by one, to the ratio γ.

Figure 12:
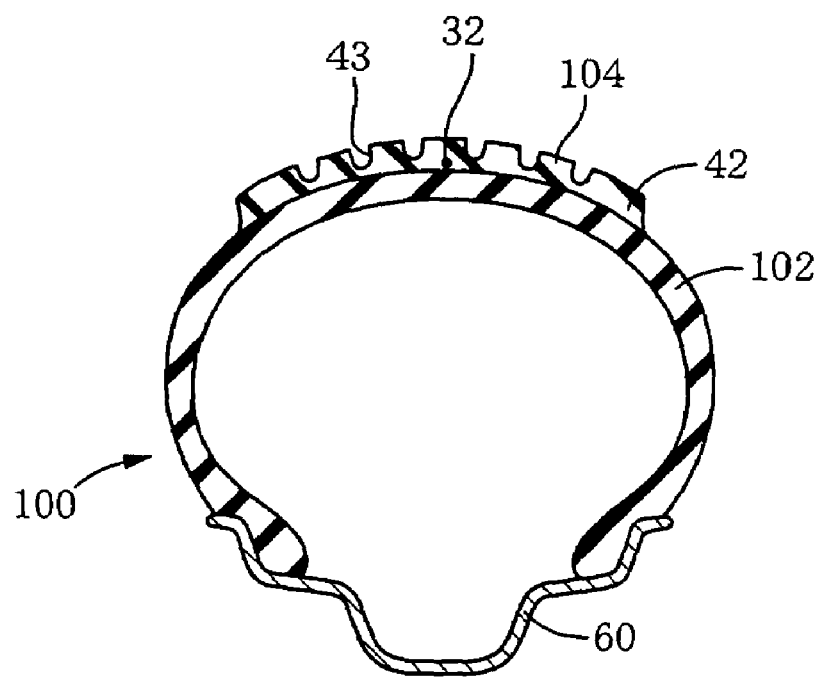
FIG. 12 is a cross-section view corresponding to FIG. 3, showing another tire in which the strain sensor is provided.

FIG. 12 shows a manner in which the strain sensor 32 is embedded in the tread portion 42 of the tire 40. More specifically described, a rubber layer 100 includes an inner portion 102 including an inner portion of the tread portion 42, and an outer portion 104 that is separate from the inner portion 102 and includes an outer portion of the tread portion 42. The inner and outer portions 102, 104 are formed by extrusion, and are cut to have respective pre-determined lengths. Then, the strain sensor 32 is interposed between the inner and outer portions 102, 104, and the thus obtained structure is molded while being vulcanized.

Figure 13:
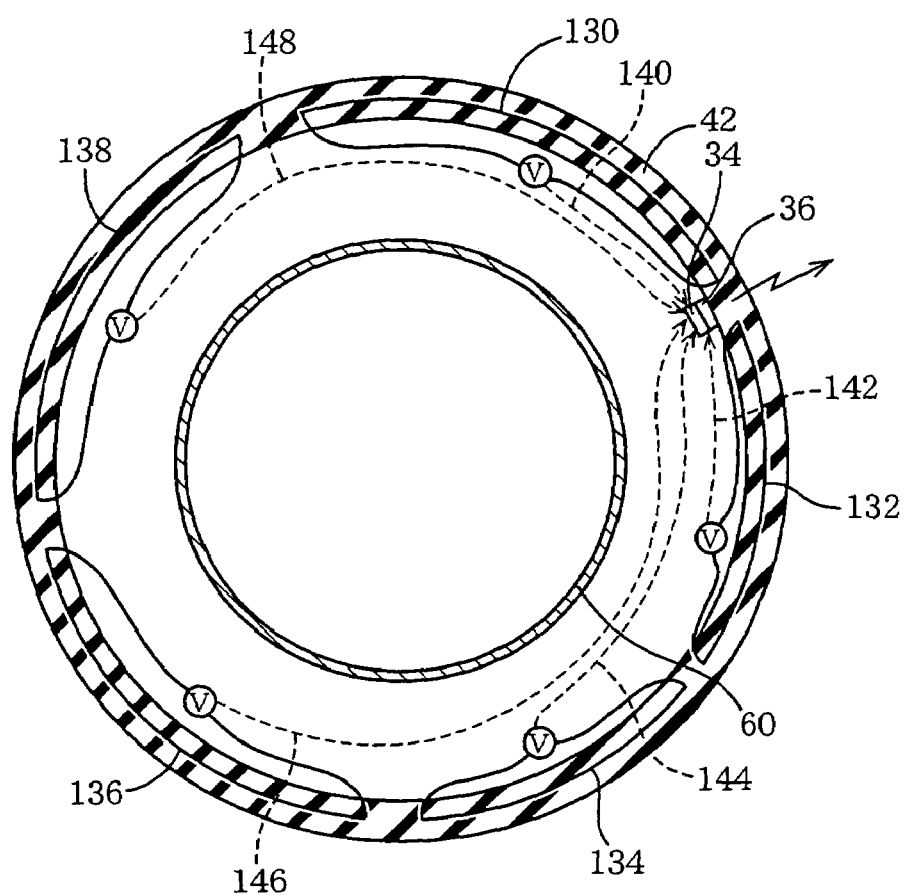
FIG. 13 is a schematic cross-section view of another tire in which a plurality of strain sensors as a portion of another tire-deformation detecting apparatus employed by another contact-state obtaining apparatus as another embodiment of the present invention, are provided.

The strain sensor 32 may not be provided along the entire circumferential length of the tire 40, but may be provided along only a part-circumferential or arcuate length of the same 40. In addition, a plurality of strain sensors may be provided along a plurality of arcuate lengths, respectively, that are located on a common circle, as shown in FIG. 13. More specifically described, in a second embodiment shown in FIG. 13, five strain sensors 130, 132, 134, 136, 138 are provided, in the tread portion 42 of the tire 40 in its force-free state, along respective circular arcs located on a common circle. In this case, a single information processing portion 34 and a single signal transmitting device 36 are provided in a portion of the tire 40 that is located radially inward of the rubber layer (or the elastic ring 62) and holds an air layer, so that after the information processing portion 34 processes respective values detected by the strain sensors 130 through 138, the signal transmitting device 36 transmits wheel-state information including the processed values. Respective signal wires 140, 142, 144, 146, 148 associated with the strain sensors 130 through 138 may be provided radially inward of the rubber layer. However, each of the strain sensors 130 through 138 may be associated with a corresponding information processing device 34 and a corresponding signal transmitting device 36.

In the illustrated embodiment, the strain sensor 32 is adapted to detect the amount δ of change of the circumferential length of the tire 40 in its force-free state. However, it is possible to employ a strain sensor that is adapted to detect a widthwise-direction strain of a radially extending portion of the tire 40, as shown in FIGS. 14 and 15.

Figure 14:
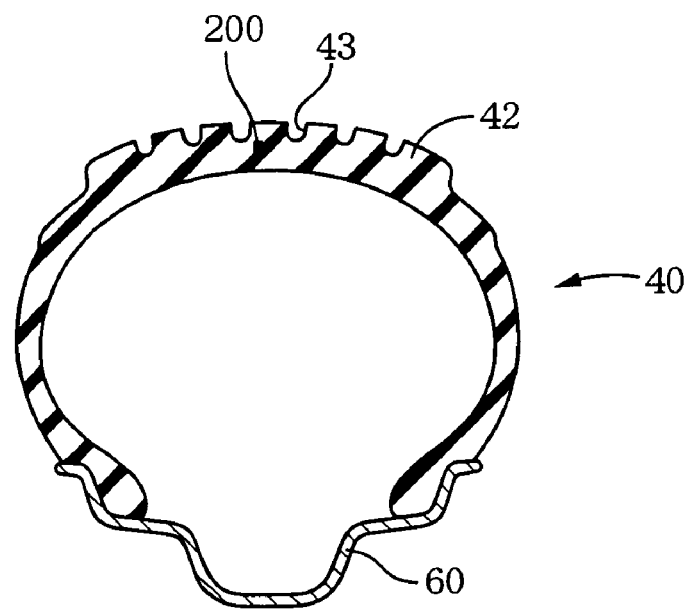
FIG. 14 is a cross-section view corresponding to FIG. 3, showing another strain sensor as a portion of another tire-deformation detecting apparatus employed by another contact-state obtaining apparatus as another embodiment of the present invention.
Figure 15:
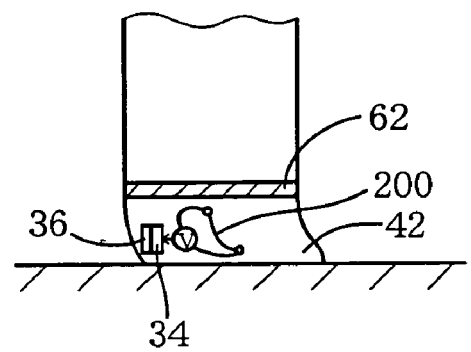
FIG. 15 is a schematic cross-section view for explaining a deformation of a tire in which the strain sensor of FIG. 14 is provided.

More specifically described, in a third embodiment shown in FIGS. 14 and 15, a strain sensor 200 is provided in the tread portion 42 such that the strain sensor 200 extends in a radial direction of the tread portion 42 and takes a position assuring that the sensor 200 can detect a deformation of the tread portion 42 in a widthwise direction thereof. The strain sensor 200 is provided in the vicinity of the grooves 43 of the tread portion 42.

A value detected by the strain sensor 200 is supplied to the information processing portion 34, and is processed by the same 34, and the signal transmitting device 36 transmits wheel-state information including the thus processed value. In the present embodiment, the information processing device 34 and the signal transmitting device 36 as well as the strain sensor 200 are embedded in the tread portion 42. The present contact-state obtaining apparatus employs four wheel-side devices 10, 12, 14, 16 and a body-side device 18 that have respective constructions basically identical with those of the four wheel-side devices 10, 12, 14, 16 and the body-side device 18 shown in FIG. 2, but only the strain sensor 200 differs from the strain sensor 32.

Figure 18:
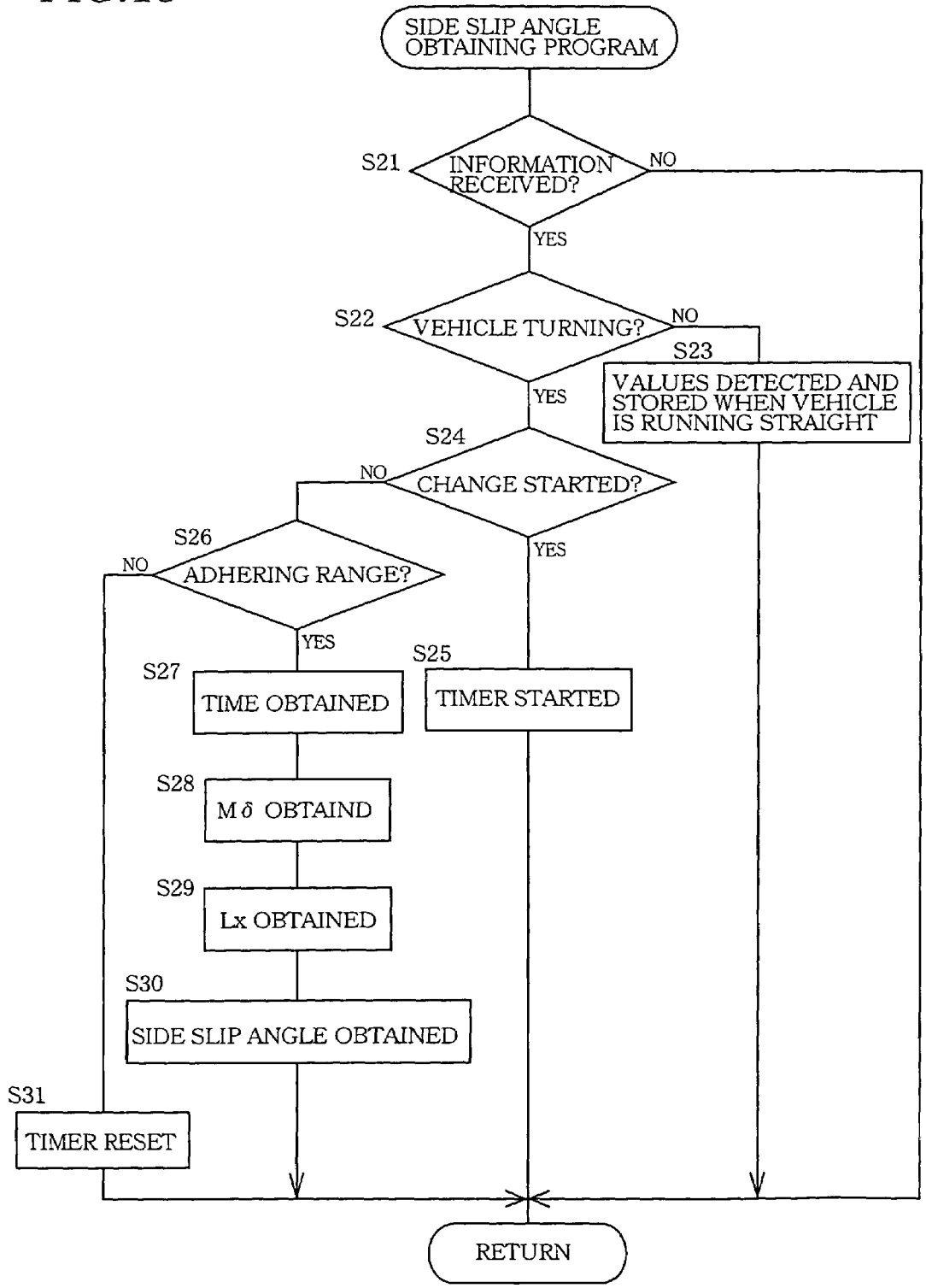
FIG. 18 is a flow chart representing a side slip angle obtaining program stored in a memory of the contact-state obtaining apparatus including the strain sensor of FIG. 14.

A memory of the information processing portion 28 of the body-side device 18 of the present apparatus stores a side slip angle obtaining program represented by a flow chart shown in FIG. 18.

In the present embodiment, a side slip angle β is obtained based on a length Lx of a surface of contact of the tire 40 with the road surface that is measured in a direction parallel to the rotation plane of the tire 40, and a strain Mδ of the tire 40 in its widthwise direction.

Figure 16:
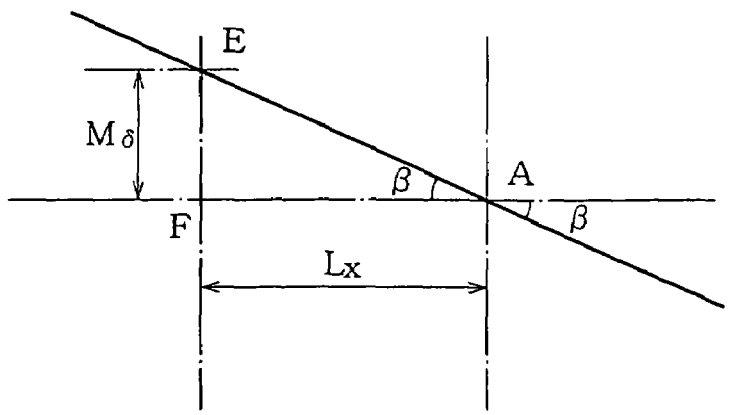
FIG. 16 is a schematic view for explaining a relationship between a widthwise-direction strain detected by the strain sensor of FIG. 14, and a side slip angle.

As illustrated in FIG. 16, the length of the contact surface of the tire 40 with the road surface in the direction parallel to the rotation plane of the tire 40 is a length Lx between Points A and F, and can be expressed by the following equation (4):

$$Lx = \omega \cdot R \cdot t \quad (4)$$

where t is a time that elapses after the time when the contact point of the tire 40 starts contacting the road surface; ω is an angular velocity of rotation of the wheel; and R is a radius of rotation of the tire 40.

In addition, the side slip angle β can be obtained based on the length Lx and an amount of deformation Mδ of the tire 40 in the widthwise direction, according to the following equation (5):

$$\tan \beta = M\delta/Lx \quad (5)$$

The measurement of the time t is started when the values detected by the strain sensor 200 start changing. It is preferred that the time t be long enough to allow detection of a large amount of deformation in the adhering range.

Figure 17:
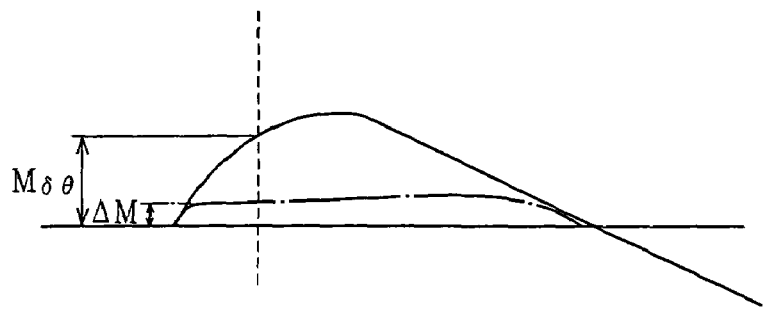
FIG. 17 is a schematic view for explaining a value detected by the strain sensor of FIG. 14 when a vehicle is running straight, and a value detected by the strain sensor of FIG. 14 when the vehicle is turning.

The deformation amount Mδ in the widthwise direction, i.e., a turning-diameter direction of the vehicle is obtained while a deformation amount ΔM detected when the vehicle is running straight is taken into account. The tread portion 42 is deformed in the widthwise direction thereof by a contact load with which the tire 40 contacts the road surface, and the strain sensor 200 also detects a widthwise-direction deformation of the tire 40 that is caused by the contact load, i.e., a vertically exerted force. Therefore, it is preferred that the deformation amount ΔM corresponding to the contact load be subtracted from a deformation amount Mδθ detected when the vehicle is turning, as illustrated in FIG. 17.

In the present embodiment, when the vehicle is running straight, the values detected by each strain sensor 200 are stored, in advance, together with respective detected velocity values of the corresponding wheel 2, 4, 6, 8. When the vehicle is turning with the wheel moving at a certain velocity, the value detected by the strain sensor 200 when the vehicle is running straight with the wheel moving at the same velocity, is read out and is subtracted from the value detected by the strain sensor 200 when the vehicle is turning. Thus, the deformation amount Mδ of the tire 40 that is caused by the force exerted thereto in the direction parallel to the road surface is obtained.

The side slip angle obtaining program represented by the flow chart of FIG. 18 is carried out at a pre-set regular interval of time. Each of the wheel-side devices 10, 12, 14, 16 starts transmitting the wheel-state information at a trigger time when the values detected by the corresponding strain sensor 200 start changing, and ends the transmission when the detected values become substantially equal to zero, i.e., decrease to below a pre-set value that can be regarded as zero. That is, the strain sensor 200 continues transmitting the wheel-state information while a portion of the tire 40 that corresponds to the sensor 200 continues contacting the road surface, but the sensor 200 does not transmit the information while that portion of the tire 40 does not contact the road surface. Thus, the strain sensor 200 periodically transmits the wheel-state information at the pre-set regular interval of time so long as the detected values are not equal to zero, i.e., are greater than the above-indicated pre-set value.

First, at Step S21 of FIG. 18, the information processing portion 28 judges whether it has received the wheel-state information from any of the wheel-side devices 10, 12, 14, 16. If a positive judgment is made at Step S21, the control of the processing portion 28 goes to Step S22 to judge whether the vehicle is turning, based on the information obtained by the turning-condition obtaining device 56 and indicating whether the vehicle is turning or running straight. If a negative judgment is made at Step S22, the control proceeds with Step S23 to perform an operation corresponding to the running-straight state of the vehicle. In this operation, the deformation amounts ΔM when the vehicle is running straight are detected, and are stored together with the detected wheel velocities, such that the deformation amounts ΔM are associated with the corresponding wheel velocities.

On the other hand, if a positive judgment is made at Step S22, the control goes to Step S24 to judge whether it is a trigger time when the values detected by the strain sensor 200 start changing. For example, the processing portion 28 judges whether the current control cycle is the control cycle in which Step S24 is carried out for the first time. If a positive judgment is made at Step S24, the control goes to Step S25 to start counting or measuring a time t using a timer.

On the other hand, if a negative judgment is made at Step S24, the control goes to Step S26 to judge whether the tire 40 is moving in the adhering range. If a positive judgment is made at Step S26, for example, if the values detected by the strain sensor 200 tend to increase, the control goes to Step S27 to obtain the time t that has elapsed since the trigger time. In addition, the control goes to Step S28 to read out the deformation amount $\Delta M$ detected by the strain sensor 200 when the vehicle is running straight with the wheel moving at the same velocity as the velocity of the wheel when the vehicle is currently turning, and obtain a deformation amount $M\delta$ ($=M\delta\theta-\Delta M$), and subsequently to Step S29 to obtain a length Lx according to the equation (4). Then, at Step S30, the processing portion 28 obtains a side slip angle $\beta$ according to the equation (5). On the other hand, if a negative judgment is made at Step S26, i.e., if the values detected by the strain sensor 200 tend to decrease, the control goes to Step S31 to reset the timer.

As is apparent from the foregoing description of the present embodiment, the deformation amount $M\delta$ of the tire 40 is directly detected, and the side slip angle $\beta$ is obtained based on the directly detected deformation amount $M\delta$. Therefore, the side slip angle $\beta$ can be obtained with accuracy. In the present embodiment, the information processing portion 28 provides a side slip angle obtaining portion, or a widthwise-direction-strain-dependent side slip angle obtaining portion.

Meanwhile, at Step S30, a plurality of side slip angle values $\beta'$ may be obtained and stored. In this case, those values $\beta'$ may be statistically processed, and the thus obtained statistical value, e.g., an average of the values may be obtained as a proper side slip angle $\beta$. In addition, a side slip angle $\beta$ may be obtained based on a widthwise-direction strain of the tire 40 that is detected when the time t that has elapsed since the trigger time is longer than a pre-set time. Since an accurate side slip angle $\beta$ can be obtained around a peak point where the widthwise-direction strain takes a maximum magnitude, a time needed to reach the peak point can be pre-set based on, e.g., the velocity values of the corresponding wheel 2, 4, 6, 8 detected by the wheel-speed sensor 56.

The information processing portion 28 may be adapted such that when the vehicle is turning, the processing portion 28 just stores the information received from each of the wheel-side devices 10, 12, 14, 16 and, after the strain sensor 200 is rotated or moved away from the road surface, the processing portion 28 starts processing the received information. In this case, the processing portion 28 can obtain a locus of the contact point of the tire 40. In addition, the processing portion 28 can obtain an accurate side slip angle $\beta$ based on information indicating that the tire 40 suffers a large widthwise-direction strain in an adhering range.

Based on the value detected by the strain sensor 200, it can be judged whether the friction coefficient $\mu$ of the road surface is great or small.

As shown in FIG. 8B, assuming that the side slip angle $\beta$ is constant, the ratio $\gamma$ is greater when the friction coefficient $\mu$ of the road surface is great, than it is when the friction coefficient $\mu$ is small. In addition, as shown in FIG. 8A, assuming that the friction coefficient $\mu$ of the road surface is constant, the ratio $\gamma$ is smaller when the side slip angle $\beta$ is great, than it is when the side slip angle $\beta$ is small. Meanwhile, the ratio $\gamma$ can be obtained based on a change of values of the widthwise-direction strain $M\delta$ that are detected iteratively or at a plurality of points of time. For example, a first point of time when the detection of the widthwise-direction strain is started, a second point of time when the detection of the widthwise-direction strain is ended, and a third point of time when the maximum magnitude of the widthwise-direction strain is detected are determined, and the ratio of a time duration between the first and third points of time to a time duration between the third and second points of time can be used as the ratio $\gamma$ of adhering range to slipping range. Alternatively, each of the adhering range and the slipping range can be calculated according to the above-described equation (4), and the ratio of thus obtained adhering range to thus obtained slipping range can be obtained as the ratio $\gamma$.

Figures 19, 20:
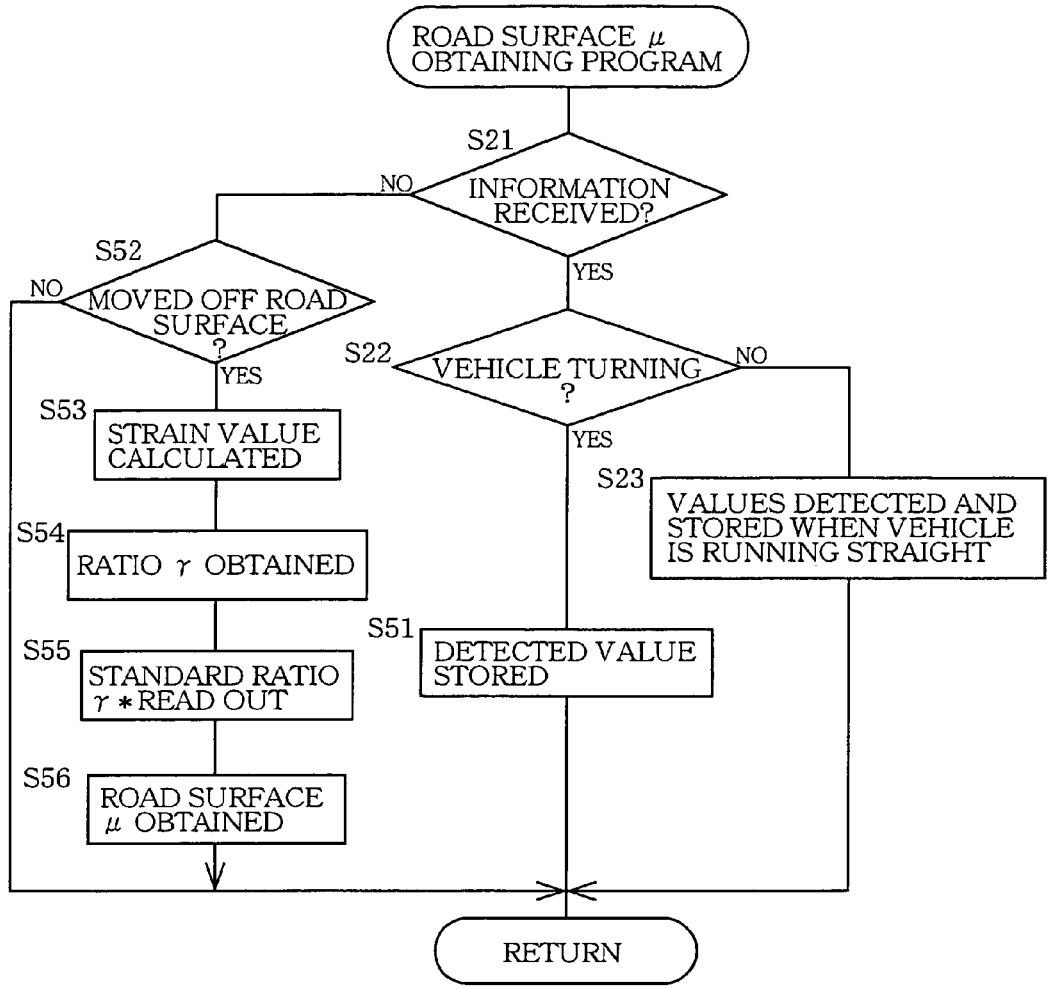
FIG. 19 is a flow chart representing a road surface μ (friction coefficient) obtaining program stored in the memory of the contact-state obtaining apparatus including the strain sensor of FIG. 14.
FIG. 20 is a map representing a standard road surface μ (friction coefficient) obtaining table stored in the memory of the contact-state obtaining apparatus including the strain sensor of FIG. 14.

A road-surface-$\mu$ obtaining program represented by the flow chart shown in FIG. 19 is carried out at a pre-set regular interval of time.

First, at Step S21 of FIG. 19, the information processing portion 28 judges whether it has received the wheel-state information from any of the wheel-side devices 10, 12, 14, 16. If a positive judgment is made at Step S21, the control of the processing portion 28 goes to Step S22 to judge whether the vehicle is turning. If a positive judgment is made at Step S22, the control goes to Step S51 to obtain an absolute value of a steering angle $\theta$ and store the thus obtained absolute value of the steering angle $\theta$ and a value detected by the strain sensor 200.

On the other hand, if a negative judgment is made at Step S21, the control goes to Step S52 to judge whether a point on the tread portion 42 that corresponds to the position where the strain sensor 200 is provided has been moved off the road surface. For example, a positive judgment is made at Step S52 when the detected values of the widthwise-direction strain have decreased and become substantially equal to zero after they took the maximum magnitude. If a positive judgment is made at Step S52, the control goes to Step S53 to obtain, as described above, a strain value of the tire 40 that is caused by the force exerted to the same 40 in the direction parallel to the road surface, by subtracting the strain value detected when the vehicle is running straight, from the strain value detected when the vehicle is turning, and additionally obtain a change of the strain values. Subsequently, at Step S54, the processing portion 28 obtains a ratio $\gamma$ based on the thus obtained change of the strain values.

Then, at Step S55, the processing portion 28 obtains a standard ratio $\gamma^*$ based on a turning condition of the vehicle (i.e., an absolute value $|\theta|$ of the steering angle $\theta$) and a standard friction coefficient $\mu^*$ of the road surface, according to a table represented by a map shown in FIG. 20; and, at Step S6, the processing portion 28 estimates a friction coefficient $\mu$ of the road surface based on the standard ratio $\gamma^*$ and the actual ratio $\gamma$. More specifically described, when the actual ratio $\gamma$ is smaller than the standard ratio $\gamma^*$, the processing portion 28 can estimate that an actual friction coefficient $\mu$ of the road surface is smaller than the standard friction coefficient $\mu^*$ of the road surface. In addition, the processing portion 28 can estimate that the actual friction coefficient $\mu$ of the road surface is smaller when a difference of the standard ratio $\gamma^*$ and the actual ratio $\gamma$ is great, than it is when the difference is small.

As is apparent from the foregoing description of the third embodiment, the actual friction coefficient $\mu$ of the road surface can be estimated based on the change of values detected by the strain sensor 200 and the turning condition of the vehicle.

In the third embodiment, the information processing portion 28 provides a friction-coefficient obtaining portion, or a ratio-related-amount-dependent friction-coefficient obtaining portion. In addition, respective portions of the processing portion 28 that store and carry out Step S54 of the friction-coefficient obtaining program cooperate with each other to provide a ratio-related-amount obtaining portion.

It is possible to employ a plurality of values each as the standard friction coefficient $\mu^*$ of the road surface and compare the actual ratio $\gamma$ with each of a plurality of values of the standard ratio $\gamma^*$ that correspond to the values of the standard friction coefficient $\mu^*$, respectively. In this case, the accuracy of estimation of the actual friction coefficient $\mu$ of the road surface can be improved.

The actual friction coefficient $\mu$ of the road surface can be estimated based on the maximum magnitude of the widthwise-direction strain of the tire 40, because it can be estimated that the maximum frictional force, and therefore the friction coefficient, of the road surface is greater when the maximum magnitude of the widthwise-direction strain is great, than it is when the maximum magnitude is small. In addition, the actual friction coefficient $\mu$ of the road surface can be estimated based on both the maximum magnitude of the widthwise-direction strain and the ratio $\gamma$. In the latter case, the accuracy of estimation of the actual friction coefficient $\mu$ can be improved.

In the third embodiment, each of the wheel-side devices 10, 12, 14, 16 transmits the wheel-state information each time the corresponding strain sensor 200 detects the strain. However, the memory of the information processing portion 34 of each of the wheel-side devices 10 through 16 may be modified to store the values detected by the corresponding strain sensor 200 while the point on the tread portion 42 that corresponds to the position where the sensor 200 is provided is kept in contact with the road surface and, after the point is moved off the road surface, transmit a batch of the stored values to the body-side device 18.

Figure 21:
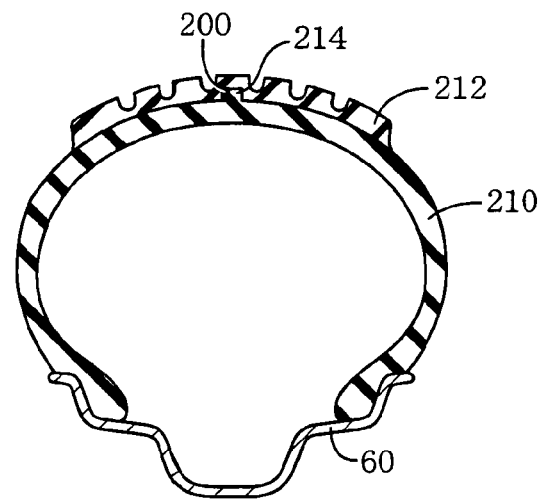
FIG. 21 is a cross-section view corresponding to FIG. 3, showing another tire in which the strain sensor of FIG. 14 is provided.

The strain sensor 200 may be directly provided by, e.g., printing in the tread portion 42, as shown in FIG. 21. It is possible to form directly, in addition to the strain sensor 200, at least one of the information processing portion 34 and the signal transmitting device 36, or to form directly at least one of the information processing portion 34 and the signal transmitting device 36 and connect the strain sensor 200 to the directly formed the processing portion 34 and/or the transmitting device 36.

In the above-indicated fourth embodiment, a rubber layer of the tire 40 includes an inner portion 210 and an outer portion 212 and, after the inner portion 210 is vulcanized, the strain sensor 200 is directly provided in the form of a stepped portion 214 radially outwardly projecting from the inner portion 210. Then, the outer portion 212 is stacked on the inner portion 210, and the thus obtained structure is molded while being vulcanized.

Figure 22:
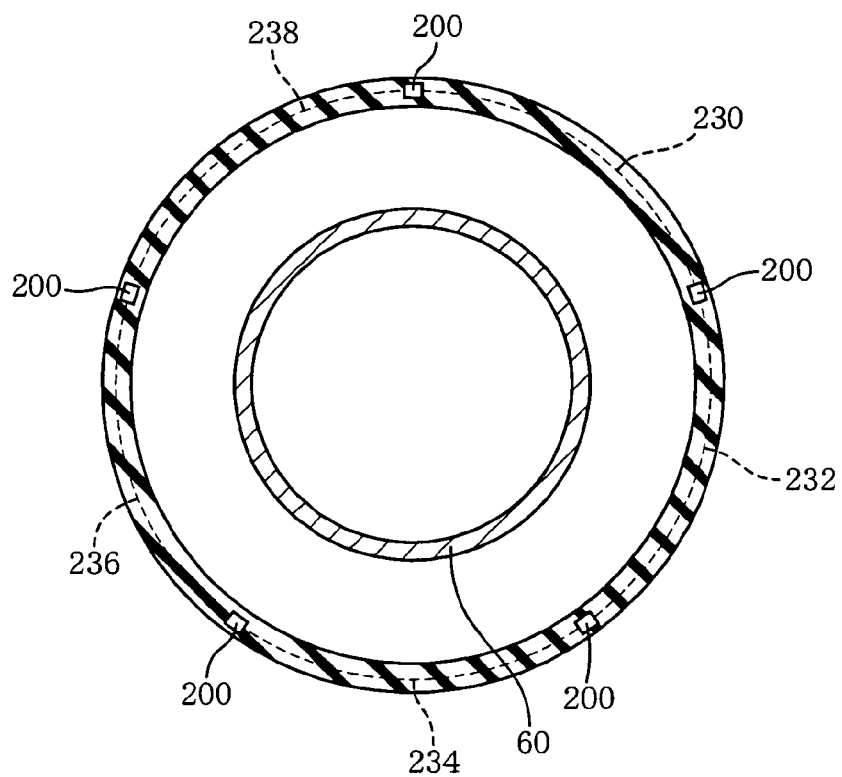
FIG. 22 is a schematic cross-section view of another tire in which a plurality of strain sensors as a portion of another tire-deformation detecting apparatus employed by another contact-state obtaining apparatus as another embodiment of the present invention, are provided.

A plurality of strain sensors 200 may be provided in a single tire 40. In addition, each of the wheel-side devices 10, 12, 14, 16 may be adapted to process respective values detected by the strain sensors 200 and transmit wheel-state information including the thus obtained value. In this case, signal wires 230, 232, 234, 236, 238 connecting the strain sensors 200 to each other may be embedded in the tread portion 42, as shown in FIG. 22, or may be provided radially inward of the rubber layer like in the second embodiment shown in FIG. 13. In the case where the respective values detected by the strain sensors 200 are statistically processed and the thus obtained statistic value is transmitted, one of respective information processing portions 34 associated with the strain sensors 200 may function as a main information processing portion that statically processes the respective values detected by the strain sensors 200 and transmits the thus obtained statistic value to the body-side device 18.

Figure 23:
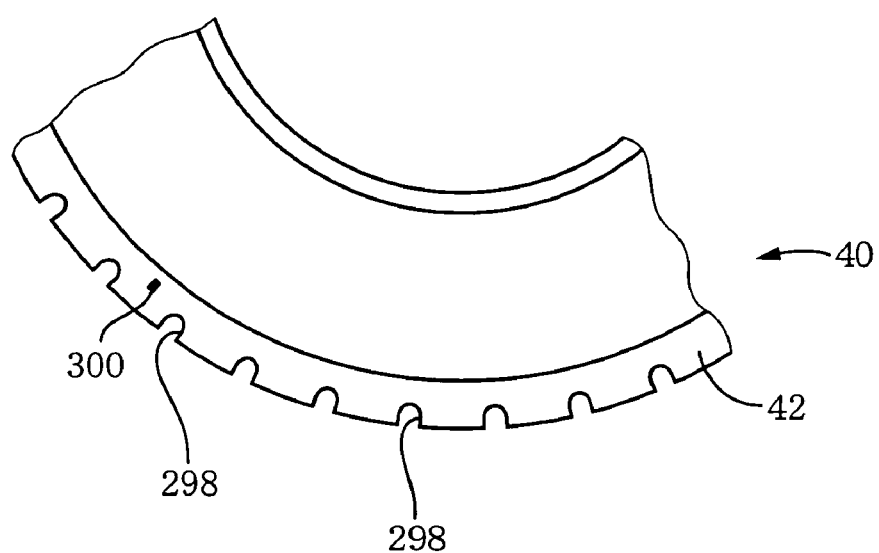
FIG. 23 is a front elevation view of a portion of another tire in which another strain sensor as a portion of another tire-deformation detecting apparatus employed by another contact-state obtaining apparatus as another embodiment of the present invention, is provided.

It is possible, as shown in FIG. 23, to employ, in place of the strain sensor 32, 200, a strain sensor 300 that detects a strain of the tire 40 in a circumferential direction thereof that is caused by a force exerted thereto in a longitudinal direction of the vehicle that is parallel to the road surface. The strain sensor 300 is provided in the vicinity of grooves 298 of the tread portion 42 that extend in a generally widthwise direction of the tire 40, i.e., in a direction intersecting the circumferential direction of the tire 40.

Based on the circumferential-direction strain of the tire 40, a braking slip or a driving slip of the corresponding wheel 2, 4, 6, 8 can be directly obtained. In addition, based on this strain, a friction coefficient $\mu$ with respect to the tire 40 and the road surface can be obtained.

The strain sensor 32, 200, 300 may be provided in not the tread portion 42 but a side wall or a seal portion of the tire 40.

Alternatively, the strain sensor 32, 200, 300 may be provided around the walls defining the grooves 43, 298 of the tread portion 42. In this case, the deformation of the tread portion 42 can be accurately detected.

The strain sensor 32, 200, 300 may be replaced with a sensor including a piezoelectric element, such that the piezoelectric element takes a position assuring that it can detect a shearing strain of the tire 40 in the widthwise direction thereof. In this case, the sensor including the piezoelectric element can obtain the shearing strain of the tread portion 42.

In another embodiment of the present invention, a deformation detecting device of a contact-state obtaining apparatus, or a deformation detecting apparatus includes a first strain sensor 200 (FIG. 15) which detects a change of a strain of a radially extending portion of a tire 40 in a widthwise direction thereof, and a second strain sensor 32 (FIG. 4) which detects an amount of change of an actual length of a circumferentially continuous portion of the tire 40 in a force-free state thereof. A contact-state obtaining portion of the contact-state obtaining apparatus includes a processing portion 28 which obtains, based on both a maximum magnitude of the strain of the tire 40 in the widthwise direction thereof detected by the first strain sensor 20 and the amount of change of the actual length detected by the second strain sensor 32, at least one of a side slip angle of the wheel 2, 4, 6, 8 and (b) a ratio of an adhering range to a slipping range.

The side slip angle or the ratio can be obtained based on the amount of change of the actual length of the radially extending portion of the tire 40, the maximum magnitude of the widthwise-direction strain, and a contact length by which the tire 40 contacts the road surface. In addition, the friction coefficient or the frictional force of the road surface can be obtained based on the ratio and a turning condition of the vehicle.

It is to be understood that the present invention may be embodied with various changes and improvements that may occur to a person skilled in the art, without departing from the spirit and scope of the invention defined in the appended claims.

What is claimed is:

1. A contact-state obtaining apparatus for obtaining a contact state in which a tire of a wheel of a vehicle contacts a road surface, the apparatus comprising:
    a deformation detecting device which is supported by the wheel and which detects a deformation of the tire that is caused by a force exerted to the tire in a direction parallel to the road surface; and a contact-state obtaining portion which obtains, as said contact state, a slipping state of the tire relative to the road surface, based on the deformation of the tire detected by the deformation detecting device,
   wherein the contact-state obtaining portion obtains, as the slipping state of the tire, a degree of slipping selected from a slip ratio and a slip angle.

2. The contact-state obtaining apparatus according to claim 1, wherein the deformation detecting device comprises a widthwise-direction-strain detecting portion which detects a strain of the tire in a widthwise direction thereof that is caused by the force exerted to the tire in a lateral direction thereof parallel to the road surface.

3. The contact-state obtaining apparatus according to claim 1, wherein the deformation detecting device comprises a circumferential-direction-strain detecting portion which detects a strain of the tire in a circumferential direction thereof that is caused by the force exerted to the tire in a longitudinal direction of the vehicle parallel to the road surface.

4. The contact-state obtaining apparatus according to claim 3, wherein the circumferential-direction-strain detecting portion detects a circumferential-direction strain of a radially extending portion of the tire that is caused by the deformation of the tire in the circumferential direction thereof.

5. The contact-state obtaining apparatus according to claim 1,
   wherein the contact-state obtaining portion comprises a side slip angle obtaining portion which obtains a side slip angle of the wheel.

6. The contact-state obtaining apparatus according to claim 1, wherein the contact-state obtaining portion is supported by a member provided on a side of a body of the vehicle, and wherein the contact-state obtaining apparatus further comprises a radio communication device which communicates, by radio, information between the deformation detecting device and the contact-state obtaining portion.

7. The contact-state obtaining apparatus according to claim 1, wherein the deformation detecting device comprises:
   a detecting portion which is embedded in an outer wall of the tire and which outputs a signal representing a deformation of the detecting portion that is caused by the force exerted to the tire in the direction parallel to the road surface; and
   a processing portion which obtains, based on the signal outputted by the detecting portion, the deformation of the tire that is caused by the force exerted to the tire in the direction parallel to the road surface.

8. The contact-state obtaining apparatus according to claim 7, wherein the processing portion is embedded in the outer wall of the tire.

9. The contact-state obtaining apparatus according to claim 7, further comprising a transmitting portion which transmits, by radio, information representing the deformation of the tire obtained by the processing portion, and wherein the transmitting portion is embedded in the outer wall of the tire.

10. The contact-state obtaining apparatus according to claim 1, wherein the contact-state obtaining portion further obtains, as said contact state, the force exerted to the tire in the direction parallel to the road surface, based on the deformation of the tire detected by the deformation detecting device.

11. The contact-state obtaining apparatus according to claim 1, wherein the contact-state obtaining portion further obtains, as the slipping state of the tire, an amount of slip.

12. A contact-state obtaining apparatus for obtaining a contact state in which a tire of a wheel of a vehicle contacts a road surface, the apparatus comprising:
   a deformation detecting device which is supported by the wheel and which detects a deformation of the tire that is caused by a force exerted to the tire in a direction parallel to the road surface; and
   a contact-state obtaining portion which obtains, as said contact state, at least one of (a) a slipping state of the tire relative to the road surface and (b) the force exerted to the tire in a direction parallel to the road surface, based on the deformation of the tire detected by the deformation detecting device,
   wherein the deformation detecting device comprises a widthwise-direction-strain detecting portion which detects a strain of the tire in a widthwise direction thereof that is caused by the force exerted to the tire in a lateral direction thereof parallel to the road surface, and
   wherein the widthwise-direction-strain detecting portion comprises at least one sensor which detects a change of an actual length of a circumferentially continuous portion of the tire, the actual length being measured in a state of the tire in which the tire is not mounted on the wheel and does not support any weights of the vehicle, the change being caused by the force exerted to the tire in the lateral direction thereof parallel to the road surface.

13. A contact-state obtaining apparatus for obtaining a contact state in which a tire of a wheel of a vehicle contacts a road surface, the apparatus comprising:
   a deformation detecting device which is supported by the wheel and which detects a deformation of the tire that is caused by a force exerted to the tire in a direction parallel to the road surface; and
   a contact-state obtaining portion which obtains, as said contact state, at least one of (a) a slipping state of the tire relative to the road surface and (b) the force exerted to the tire in a direction parallel to the road surface, based on the deformation of the tire detected by the deformation detecting device,
   wherein the contact-state obtaining portion comprises:
   a ratio-related-amount obtaining portion which obtains a ratio-related amount that is related to a ratio of one of an adhering range in which the tire adheres to the road surface and a slipping range in which the tire slips on the road surface, to an other of the adhering range and the slipping range; and
   a ratio-related-amount-dependent contact-state obtaining portion which obtains, based on at least the ratio-related amount obtained by the ratio-related-amount obtaining portion, said at least one of (a) the slipping state of the tire and (b) the force exerted to the tire.

14. The contact-state obtaining apparatus according to claim 13, wherein the ratio-related-amount-dependent contact-state obtaining portion comprises a turning-condition detecting portion which detects a turning condition of the vehicle, and obtains, based on the ratio-related amount obtained by the ratio-related-amount obtaining portion, and the turning condition of the vehicle detected by the turning-condition detecting portion, said at least one of (a) the slipping state of the tire and (b) the force exerted to the tire.

15. The contact-state obtaining apparatus according to claim 13, wherein the ratio-related-amount obtaining portion comprises a strain-change-dependent ratio-related-amount obtaining portion which obtains the ratio-related amount, based on a change of a strain of the tire in a widthwise direction thereof.

16. The contact-state obtaining apparatus according to claim 15, wherein the ratio-related-amount-dependent contact-state obtaining portion comprises a friction-coefficient obtaining portion which obtains a friction coefficient of the road surface, based on at least the ratio-related amount obtained by the ratio-related-amount obtaining portion.

17. The contact-state obtaining apparatus according to claim 16, wherein the ratio-related-amount-dependent contact-state obtaining portion further comprises a turning-condition detecting portion which detects a turning condition of the vehicle, and wherein the friction-coefficient obtaining portion obtains the friction coefficient of the road surface, based on the ratio-related amount obtained by the ratio-related-amount obtaining portion and the turning condition of the vehicle detected by the turning-condition detecting portion.

18. The contact-state obtaining apparatus according to claim 13, wherein the ratio-related-amount obtaining portion comprises a friction-coefficient-dependent ratio-related-amount obtaining portion which obtains the ratio-related amount based on at least a friction coefficient with respect to the tire and the road surface.

19. The contact-state obtaining apparatus according to claim 18, wherein the contact-state obtaining portion further comprises a turning-condition detecting portion which detects a turning condition of the vehicle, and wherein the friction-coefficient-dependent ratio-related-amount obtaining portion obtains the ratio-related amount based on the friction coefficient with respect to the tire and the road surface and the turning condition of the vehicle detected by the turning-condition detecting portion.

20. The contact-state obtaining apparatus according to claim 13, wherein the deformation detecting device comprises a widthwise-direction-strain detecting portion which detects, as a strain of the tire in a widthwise direction thereof, an amount of change of an actual length of a circumferentially continuous portion of the tire in a state of the tire in which the tire is not mounted on the wheel and does not support any weights of the vehicle, the change being caused by the force exerted to the tire in a lateral direction thereof parallel to the road surface, and wherein the ratio-related-amount-dependent contact-state obtaining portion further comprises a side-slip-angle obtaining portion which obtains a side slip angle of the wheel based on at least the ratio-related amount obtained by the ratio-related-amount obtaining portion and the amount of change of the actual length detected by the widthwise-direction-strain detecting portion.

21. The contact-state obtaining apparatus according to claim 13, wherein the deformation detecting device comprises a widthwise-direction-strain detecting portion which detects a strain of the tire in a widthwise direction thereof that is caused by the force exerted to the tire in a lateral direction thereof parallel to the road surface, and wherein the ratio-related-amount-dependent contact-state obtaining portion further comprises a side-slip-angle obtaining portion which obtains a side slip angle of the wheel based on at least the ratio-related amount obtained by the ratio-related-amount obtaining portion and a maximum magnitude of the strain of the tire in the widthwise direction thereof detected by the widthwise-direction-strain detecting portion.

22. A contact-state obtaining apparatus for obtaining a contact state in which a tire of a wheel of a vehicle contacts a road surface, the apparatus comprising:
  a deformation detecting device which is supported by the wheel and which detects a deformation of the tire that is caused by a force exerted to the tire in a direction parallel to the road surface; and
  a contact-state obtaining portion which obtains, as said contact state, at least one of (a) a slipping state of the tire relative to the road surface and (b) the force exerted to the tire in a direction parallel to the road surface, based on the deformation of the tire detected by the deformation detecting device,
  wherein the deformation detecting device comprises an actual-length-change detecting portion which detects an amount of change of an actual length of a circumferentially continuous portion of the tire in a state of the tire in which the tire is not mounted on the wheel and does not support any weights of the vehicle, and
  wherein the contact-state obtaining portion comprises a friction-coefficient-dependent side-slip-angle obtaining portion which obtains a side slip angle of the wheel based on at least the amount of change of the actual length detected by the actual-length-change detecting portion and a friction coefficient with respect to the tire and the road surface.

23. The contact-state obtaining apparatus according to claim 22, wherein the friction-coefficient-dependent side-slip-angle obtaining portion obtains a side slip angle of the wheel based on at least the amount of change of the actual length detected by the actual-length-change detecting portion, a turning condition of the vehicle, and a friction coefficient with respect to the tire and the road surface.

24. A contact-state obtaining apparatus for obtaining a contact-state in which a tire of a wheel of a vehicle contacts a road surface, the apparatus comprising:
  a deformation detecting device which is supported by the wheel and which detects a deformation of the tire that is caused by a force exerted to the tire in a direction parallel to the road surface; and
  a contact-state obtaining portion which obtains, as said contact-state, a slipping state of the tire relative to the road surface, based on the deformation of the tire detected by the deformation detecting device,
  wherein the contact-state obtaining portion obtains, as the slipping state of the tire, a degree of slipping selected from the group consisting of an amount of slip, a slip ratio, and a side slip angle, and
  wherein the contact-state obtaining portion comprises a contact-length obtaining portion which obtains a contact length by which the tire contacts the road surface.

25. A contact-state obtaining apparatus for obtaining a contact state in which a tire of a wheel of a vehicle contacts a road surface, the apparatus comprising:
  a deformation detecting device which is supported by the wheel and which detects a deformation of the tire that is caused by a force exerted to the tire in a direction parallel to the road surface; and
  a contact-state obtaining portion which obtains, as said contact state, a slipping state of the tire relative to the road surface, based on the deformation of the tire detected by the deformation detecting device,
  wherein the deformation detecting device comprises a widthwise-direction-strain detecting portion which detects a strain of the tire in a widthwise direction thereof that is caused by the force exerted to the tire in a lateral direction thereof parallel to the road surface.

26. The contact-state obtaining apparatus according to claim 25, wherein the widthwise-direction-strain detecting portion comprises at least one sensor which detects a widthwise-direction strain of a radially extending portion of the tire that is caused by the deformation of the tire in the widthwise direction thereof.

27. The contact-state obtaining apparatus according to claim 26, further comprising an information processing portion which obtains, based on a value obtained by subtracting a value detected by said at least one sensor when the vehicle is running straight, from a value detected by said at least one sensor when the vehicle is turning, the widthwise-direction strain of the tire that is caused by the force exerted to the tire in the lateral direction thereof parallel to the road surface.

28. The contact-state obtaining apparatus according to claim 25, wherein the contact-state obtaining portion comprises a widthwise-direction-strain-dependent side-slip-angle obtaining portion which obtains a side slip angle of the wheel based on a length of a contact portion of the tire with the road surface in a direction parallel to a plane on which the wheel is rotated, and an amount of deformation of the tire that corresponds to the strain of the tire in the widthwise direction thereof.

29. The contact-state obtaining apparatus according to claim 25, wherein the deformation detecting device comprises, as the widthwise-direction-strain detecting portion, a first detecting portion which detects a change of a strain of a radially extending portion of the tire in the widthwise direction thereof, and further comprises a second detecting portion which detects an amount of change of an actual length of a circumferentially continuous portion of the tire in a state of the tire in which the tire is not mounted on the wheel and does not support any weights of the vehicle, the change of the actual length being caused by the force exerted to the tire in the lateral direction thereof parallel to the road surface, and wherein the contact-state obtaining portion comprises a complex contact-state obtaining portion which obtains the slipping state of the tire, based on both a maximum magnitude of the strain of the tire in the widthwise direction thereof detected by the first detecting portion and the amount of change of the actual length detected by the second detecting device.

30. The contact-state obtaining apparatus according to claim 25, wherein the contact-state obtaining portion comprises a strain-change-dependent contact-state obtaining portion which obtains the slipping state of the tire, based on a change of the strain of the tire in the widthwise direction thereof iteratively detected by the widthwise-direction-strain detecting portion.

31. The contact-state obtaining apparatus according to claim 25, wherein the contact-state obtaining portion comprises a contact-length obtaining portion which obtains a contact length by which the tire contacts the road surface.

32. The contact-state obtaining apparatus according to claim 25, wherein the contact-state obtaining portion further obtains, as said contact state, the force exerted to the tire in the direction parallel to the road surface, based on the deformation of the tire detected by the deformation detecting device.

* * * * *